(12) United States Patent
Curtis et al.

(10) Patent No.: US 7,742,209 B2
(45) Date of Patent: Jun. 22, 2010

(54) MONOCULAR HOLOGRAPHIC DATA STORAGE SYSTEM ARCHITECTURE

(75) Inventors: Kevin R. Curtis, Longmont, CO (US); Ken E. Anderson, Boulder, CO (US); Friso Schlottau, Lyons, CO (US); Tatsuro Ide, Kawasak (JP); Ken'ichi Shimada, Yokohama (JP); Takeshi Shimano, Yokohama (JP); Harukazu Miyamoto, Tokyo (JP)

(73) Assignee: InPhase Technologies, Inc., Longmont, CO (US)

( * ) Notice: Subject to any disclaimer, the term of this patent is extended or adjusted under 35 U.S.C. 154(b) by 0 days.

(21) Appl. No.: 11/840,410

(22) Filed: Aug. 17, 2007

(65) Prior Publication Data
US 2008/0100890 A1    May 1, 2008

Related U.S. Application Data

(60) Provisional application No. 60/855,754, filed on Nov. 1, 2006, provisional application No. 60/872,472, filed on Dec. 4, 2006.

(51) Int. Cl.
*G03H 1/10* (2006.01)
(52) U.S. Cl. .............................. 359/10; 359/30; 359/35
(58) Field of Classification Search .................. None
See application file for complete search history.

(56) References Cited

U.S. PATENT DOCUMENTS

| 6,103,454 | A | 8/2000 | Dhar et al. |
|---|---|---|---|
| 6,348,983 | B1 | 2/2002 | Curtis et al. |
| 6,418,106 | B1 | 7/2002 | Stoll |
| 6,482,551 | B1 | 11/2002 | Dhar et al. |
| 6,650,447 | B2 | 11/2003 | Curtis et al. |
| 6,721,076 | B2 | 4/2004 | King et al. |
| 6,743,552 | B2 | 6/2004 | Setthachayanon et al. |
| 6,765,061 | B2 | 7/2004 | Dhar et al. |
| 6,780,546 | B2 | 8/2004 | Trentler et al. |
| 6,909,529 | B2 | 6/2005 | Curtis |
| 6,995,882 | B2 | 2/2006 | Horimai |
| 7,092,133 | B2 | 8/2006 | Anderson et al. |
| 7,161,723 | B1 | 1/2007 | Silveira |
| 7,167,286 | B2 | 1/2007 | Anderson et al. |
| 7,557,970 | B2 * | 7/2009 | Furuki et al. .................. 359/11 |
| 2003/0039001 | A1 | 2/2003 | King et al. |
| 2003/0206320 | A1 | 11/2003 | Cole et al. |
| 2004/0027625 | A1 | 2/2004 | Trentler et al. |
| 2006/0114536 | A1* | 6/2006 | Uno et al. ..................... 359/24 |

(Continued)

OTHER PUBLICATIONS

PCT/US2008/64330 International Search Report and the Written Opinion of the International Searching Authority, or the Declaration mailed Aug. 15, 2008.

(Continued)

*Primary Examiner*—Arnel C Lavarias
(74) *Attorney, Agent, or Firm*—Vedder Price P.C.; Ajay A. Jagtiani

(57) ABSTRACT

A monocular holographic storage device or system to provide for compact recording and/or reading of data pages in a holographic storage medium. Also provided are methods for carrying out such data storage and/or data recovery using a monocular holographic storage device or system. Further provided are articles including holographic storage media for recording or for reading recorded data using such devices or systems.

30 Claims, 20 Drawing Sheets

U.S. PATENT DOCUMENTS

| | | |
|---|---|---|
| 2006/0203328 A1 | 9/2006 | Lazarev et al. |
| 2006/0203689 A1 | 9/2006 | Kanaoka et al. |
| 2006/0279823 A1 | 12/2006 | Riley et al. |
| 2006/0281021 A1 | 12/2006 | Riley et al. |
| 2007/0030787 A1 | 2/2007 | Kim |
| 2007/0127100 A1 | 6/2007 | Wilson et al. |
| 2007/0140091 A1* | 6/2007 | Lin et al. .................... 369/103 |
| 2009/0080042 A1* | 3/2009 | Curtis et al. ................... 359/3 |

OTHER PUBLICATIONS

PCT/US2007/76188 International Search Report and the Written Opinion of the International Searching Authority, or the Declaration mailed Aug. 22, 2008.

U.S. Appl. No. 60/907,445, filed Apr. 2, 2007, Bell et al.

Anderson, et al., "High Speed Holographic Data Storage at 500Gb/$in^2$," SMPTE Motion Imaging Journal, May/Jun. 2006.

Yukiko Nagasaka, et al., "Multiplexing Method with Non-Coaxial Spherical Waves for Holographic Data Storage," ISOM 2006.

Hoskins, et al., "Temperature Compensation Strategy for Holographic Storage," ODS 2006, Apr. 23-26, 2006.

Ayres, et al., "Image Oversampling for Page-Oriented Optical Data Storage," Applied Optics, vol. 45, No. 11, Apr. 10, 2006.

Sako, et al., "Line Segment Hologram Writer Utilizing 1D Spatial Light Modulator," Proceedings of SPIE, vol. 5380, 2004, pp. 289-296.

Chuang, et al., Holographic Read-Only-Memory System for High-Speed Replication, Jpn. J. Appl. Phys., vol. 42, 2003, pp. 976-980.

* cited by examiner

FIG. 6
FIG. 7
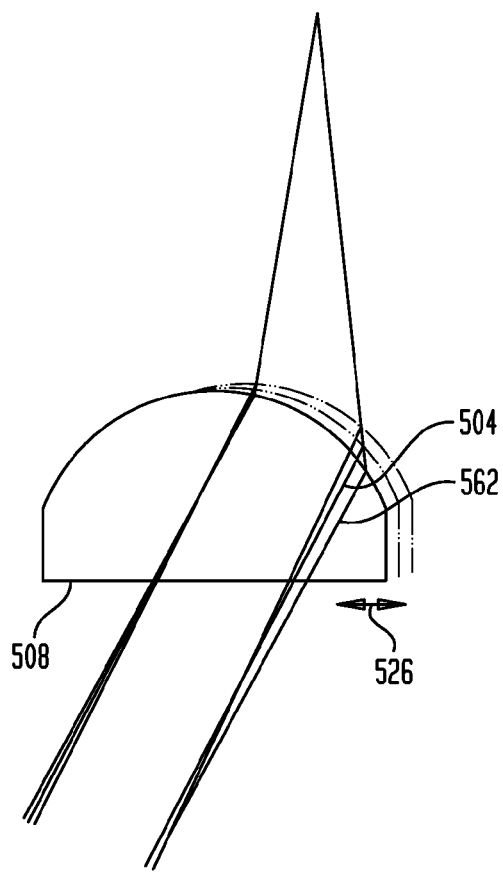
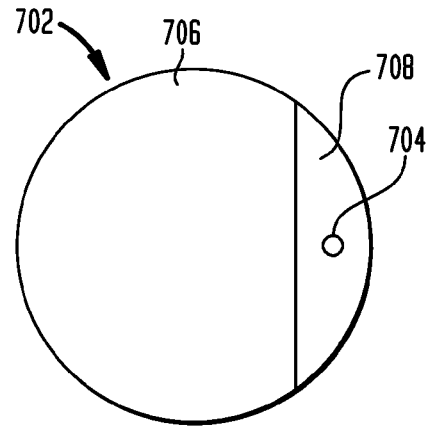

MONOCULAR HOLOGRAPHIC DATA STORAGE SYSTEM ARCHITECTURE

CROSS-REFERENCE TO RELATED APPLICATIONS

This application makes reference to the following co-pending U.S. Patent Applications. The first application is U.S. Prov. App. No. 60/855,754, entitled "MONOCULAR HOLOGRAPHIC DATA STORAGE SYSTEM ARCHITECTURE," filed Nov. 1, 2006. The second application is U.S. Prov. App. No. 60/872,472, entitled "PHASE CONJUGATE READOUT GEOMETRIES FOR HOLOGRAPHIC DATA STORAGE," filed Dec. 4, 2006. The entire disclosure and contents of the above applications are hereby incorporated by reference.

STATEMENT OF JOINT RESEARCH AGREEMENT

In compliance with 37 C.F.R. §1.71(g) (1), disclosure is herein made that the inventions described and claimed herein were made pursuant to a Joint Research Agreement as defined in 35 U.S.C. 103 (c) (3), that was in effect on or before the date the inventions were made, and as a result of activities undertaken within the scope of the Joint Research Agreement, by or on the behalf of Hitachi Co., Ltd. and InPhase Technologies, Inc.

BACKGROUND

1. Field of the Invention

The present invention relates to holographic data storage devices, systems, articles, and methods for recording (storing) and/or reading (recovering) holographic data.

2. Related Art

In holographic data storage, there are many methods used for recording multiplexed pages of data in the same location in the holographic storage medium. Multiplexing many pages of information into the same location is what gives holographic data storage such large possible real bit densities (upwards of 1.6 Tb/in2). The choice of multiplexing geometry is quite involved and has many considerations to take into account: size, cost, complexity, robustness to external environment such as temperature, etc.

For consumer products, size may be a very important factor in producing an inexpensive system. Reducing the number of lens elements in a holographic system may also be important to decreasing size. In addition, smaller spatial light modulators and cameras may be important to size reduction. The size of the lenses used to read and write to the holographic storage medium may also be important in determining the overall height/size of the system.

SUMMARY

According to a broad aspect of the present invention, there is provided a holographic data storage devices or systems which utilize a single objective lens (monocular architecture) through which the data beam and reference beam are passed prior to the entering the holographic storage medium and which may combine angle and polytopic multiplexing, as well as utilizing phase conjugate reconstruction and readout of multiple holograms. The monocular architecture in these devices or systems provides more compact recording and reading of data pages in a holographic storage medium. Also according to another broad aspect of the present invention, there are provided methods for carrying out data storage and/or data recovery using such devices or systems. Further according to another broad aspect of the present invention, there are provided articles comprising holographic storage media for recording or for reading recorded data using such devices or systems.

BRIEF DESCRIPTION OF THE DRAWINGS

The invention will be described in conjunction with the accompanying drawings, in which:

FIG. 6 is a schematic view illustrating dithering reference beam by moving the objective lens in the device or system of FIG. 5;

FIG. 7 is a circular cross-section view of an SLM that may be used in the device and system of FIG. 5;

DETAILED DESCRIPTION

Figure 1:
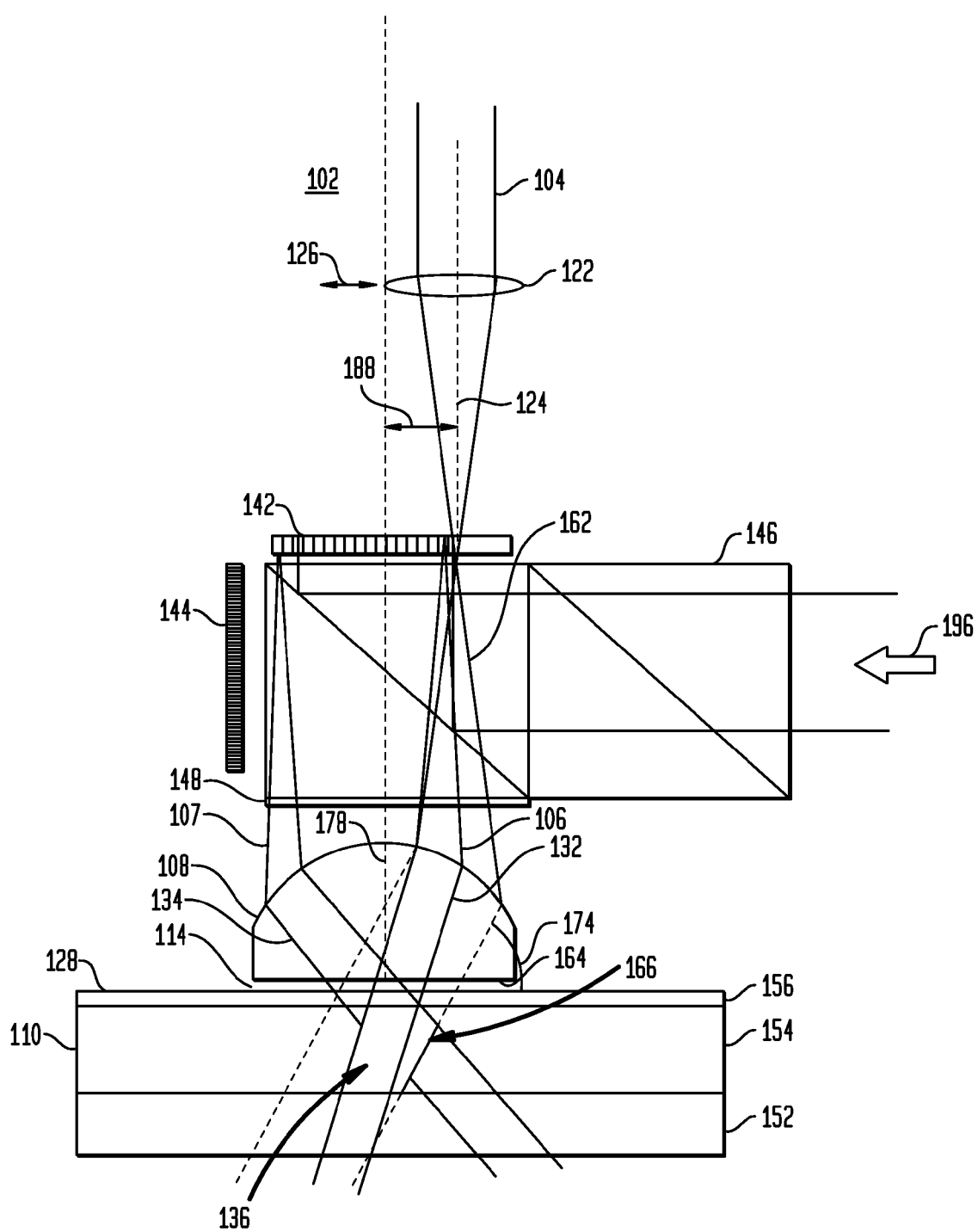
FIG. 1 is schematic view illustrating data storage by a monocular holographic storage device or system using a moving reference beam lens to create an angularly multiplexed beam.

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, the term "coherent light beam" refers to a beam of light including waves with a particular (e.g., constant) phase relationship, such as, for example, a laser beam. A coherent light beam may also be referred to as light in which the phases of all electromagnetic waves at each point on a line normal to the direction of the light beam are identical.

For the purposes of the present invention, the term "corner cube" or "corner reflector" refers to an optical device having the shape of part of a cube with three mutually perpendicular reflecting surfaces. Such an optical device reflects a beam of any incident angle in a parallel direction to the incident beam after reflecting three times inside the corner cube as shown, for example, in FIG. 15.

For the purposes of the present invention, the term "data beam" refers to a beam containing a data signal. For example, a data beam may include beams that have been modulated by a modulator such as a spatial light modulator (SLM), along with a beam generated in response to a reference beam impingent on a holographic storage medium, where the generated beam includes data. The modulation of the data beam may be an amplitude, a phase or some combination of the amplitude and phase. The SLM may be reflective or transmissive. The data beam may be modulated into a binary state or into a plurality of states.

For the purposes of the present invention, the term "data modulated beam" refers to a data beam that has been modulated by a modulator such as a spatial light modulator (SLM). The modulation of the data beam may be an amplitude, a phase or some combination of the amplitude and phase. The SLM may be reflective or transmissive. The data beam may be modulated into a binary state or into a plurality of states.

For the purposes of the present invention, the term "data modulator" refers to any device that is capable of optically representing data in one or two-dimensions from a signal beam.

For the purposes of the present invention, the term "data page" or "page" refers to the conventional meaning of data page as used with respect to holography. For example, a data page may be a page of data (i.e., a two-dimensional assembly of data), one or more pictures, etc., to be recorded or recorded in a holographic storage medium.

For the purposes of the present invention, the term "detector" refers to any type of device capable of detecting something. For example, exemplary detectors may include devices capable of detecting the presence or intensity of light, such as for example, a camera or quad cell, complementary metal-oxide-semiconductor (CMOS) imaging sensors or arrays, charge-coupled device (CCD) arrays, etc.

For the purposes of the present invention, the term "disk" refers to a disk-shaped holographic storage medium.

For the purposes of the present invention, the term "dithering" refers to moving an object, for example, a lens, mirror, reflective layer, etc., back and forth.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein digital data is recorded page-wise, the signal beam may be encoded with a data modulator, e.g., a spatial light modulator, etc.

For the purposes of the present invention, the term "storage medium" refers to any component, material, etc., capable of storing information, such as, for example, a holographic storage medium.

For the purposes of the present invention, the term "holographic storage medium" refers to medium that has a least one component, material, layer, etc., that is capable of recording and storing one or more holograms (e.g., bit-wise, linear array-wise or page-wise) as one or more patterns of varying refractive index imprinted into the medium. Examples of a holographic medium useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003/0206320 (Cole et al.) published Nov. 6, 2003; and U.S. Patent Application No. 2004/0027625 (Trentler et al.), published Feb. 12, 2004, the entire contents and disclosures of which are herein incorporated by reference. A holographic storage medium of the present invention may be any type of holographic storage medium including: a transparent holographic storage medium, a holographic storage medium including a plurality of components or layers such as a reflective layer, a holographic storage medium including a reflective layer and a polarizing layer so reflection may be controlled with polarization, a holographic storage medium including a variable beam transmission layer that may be pass, absorb, reflect, be transparent to, etc., light beams, grating layers for reflecting light beams, substrates, substrates with servo markings, etc.

For the purposes of the present invention, the term "upper surface" refers to the surface of the holographic storage medium that acts as an interface between the air and the holographic storage medium.

For the purposes of the present invention, the term "holographic recording" refers to the act of recording a hologram in a holographic storage medium. The holographic recording may provide bit-wise storage (i.e., recording of one bit of data), may provide storage of a 1-dimensional linear array of data (i.e., a 1×N array, where N is the number linear data bits), or may provide 2-dimensional storage of a page of data.

For the purposes of the present invention, the term "multiplexing" refers to recording, storing, etc., a plurality of holograms in the same volume or nearly the same volume of the holographic storage medium by varying a recording parameter(s) including, but not limited to, angle, wavelength, phase code, shift, correlation, peristrophic, etc., including combinations of parameters, e.g. angle-polytopic multiplexing For example, angle multiplexing involves varying the angle of the plane wave or nearly plane wave of the reference beam during recording to store a plurality of holograms in the same volume. The multiplexed holograms that are recorded, stored, etc., may be read, retrieved, reconstructed, recovered, etc., by using the same recording parameter(s) used to record, store, etc., the respective holograms.

For the purposes of the present invention, the term "light source" refers to a source of electromagnetic radiation having a single wavelength or multiple wavelengths. The light source may be from a laser, one or more light emitting diodes (LEDs), etc.

For the purposes of the present invention, the term "mode" refers to a wavelength of light generated by a light source.

For the purposes of the present invention, the term "single mode" refers to a single wavelength of light generated by a light source. For example, a single mode laser produces a single dominant wavelength.

For the purposes of the present invention, the term "multimode" refers to multiple wavelengths of light generated by the light source. For example, a multi-mode laser produces multiple wavelengths of light with significant power.

For the purposes of the present invention, the term "optical steering subsystem" refers to any device or combination of devices capable of directing light in a particular direction. Exemplary optical steering subsystems may include a mirror (e.g., a galvo mirror), a combination of mirrors, lenses, and/or other devices, etc.

For the purposes of the present invention, the term "partially reflective surface" refers to any surface of an object capable of reflecting a portion of light while allowing another portion to pass through the surface.

For the purposes of the present invention, the term "plane wave" refers to a constant-frequency wave whose wavefronts (surfaces of constant phase) are substantially or nearly parallel planes of constant amplitude and normal to the direction of the wave and exist in a localized region of space. Exemplary plane waves may include collimated light such as those associated with laser beams for laser pointers, etc.

For the purposes of the present invention, the term "processor" refers to a device capable of, for example, executing instructions, implementing logic, calculating and storing values, etc. Exemplary processors may include application specific integrated circuits (ASIC), central processing units, microprocessors, such as, for example, microprocessors commercially available from Intel and AMD, etc.

For the purposes of the present invention, the term "reading data" refers to retrieving, recovering, or reconstructing holographic data stored in a holographic storage medium.

For the purposes of the present invention, the term "recording data" refers to storing or writing holographic data into a holographic storage medium.

For the purposes of the present invention, the term "recording light" refers to a light source used to record information, data, etc., into a holographic storage medium.

For the purposes of the present invention, the term "phase conjugate" when referring to a light beam refers to a light beam which is an exact or very close replica of a second light beam, but propagating exactly or very closely in the reverse direction of the second light beam.

For the purposes of the present invention, the term "phase conjugate optical system" refers to any device that causes a reference beam (also referred to as a "reconstruction beam" when used for data recovery) of a holographic storage device or system to be reflected (directed) back along the path of the reference (reconstruction) beam in the opposition direction. Examples of phase conjugate optical systems may include a corner cube, a corner cube array, a controlled electro-optic (EO) crystal, a controlled blazed grating, a holographic grating, surface relief structure, and the combination of a variable layer and a grating (whether a holographic grating or surface relief structure) as shown in, for example, FIGS. 28 and 29, etc.

For the purposes of the present invention, the term "recovered beam" refers to a beam generated by the reference (reconstruction) beam which is provided by the phase conjugate optical system. The phase conjugate of the reference (reconstruction) beam will reconstruct the phase conjugate of the data beam which propagates backwards along the original data beam's optical path to be recovered as a data page by a detector (e.g., camera). The recovered beam is formed by the phase conjugate reference (reconstruction) beam diffracting from a hologram of a data page stored in the holographic storage medium. For example, with angle multiplexed holograms, for a given angle a certain data page will be Bragg matched and the phase conjugate reference (reconstruction) beam will diffract and form the recovered beam. Since the phase conjugate reference (reconstruction) beam is used at that correct angle and wavelength (Bragg condition), the desired data page will be reconstructed as a phase conjugate beam which propagates back to where the data beam originated from. The phase conjugate nature allows the recovered beam to undo aberrations that may have been introduced during recording of the holograms and to form a higher quality data page at the detector. This happens if the hologram and reference (reconstruction) beam are within tolerance of being phase conjugate of the original reference beam and relative location to similar optics. For some optical designs, these tolerances may be multiple waves of aberration in the phase conjugate reference (reconstruction) plane wave and many tens of microns in relative position of the hologram and optical system. The reference (reconstruction) beam may also Bragg match out a traditional hologram, but will propagate out of the optical system (i.e., not back to the detector/SLM).

For the purposes of the present invention, the term "reference beam" refers to a beam of light not modulated with data. Exemplary reference beams include non-data bearing laser beams used while recording data to, or reading data from a holographic storage medium. In some embodiments, the reference beam may refer to the original reference beam used to record the hologram, to a reconstruction beam when used to recover data from the holographic storage medium, or to the phase conjugate of the original reference (reconstruction) beam.

For the purposes of the present invention, the term "refractive index profile" refers to a three-dimensional (X, Y, Z) mapping of the refractive index pattern recorded in a holographic storage medium.

For the purposes of the present invention, the term "dynamic range" or "M#" of a material refers to a conventional measure of how many holograms at a particular diffraction efficiency may be multiplexed at a given location in the material (e.g., recording material layer, holographic storage medium, etc.) and is related to the materials index change, material thickness, wavelength of light, optical geometry, etc.

For the purposes of the present invention, the term "spatial light modulator" (SLM) refers to a device that stores information on a light beam by, for example, modulating the spatial intensity and/or phase profile of the light beam.

For the purposes of the present invention, the term "spatial light intensity" refers to a light intensity distribution or pattern of varying light intensity within a given volume of space.

For the purposes of the present invention, the term "book" or "stack" refers to a group of angular multiplexed holograms that span a particular angular range. A book is a group of angular multiplexed holograms that may be all in one location in the holographic storage medium or slightly shifted from one another or shifted from another group of holograms. The term book refers to both traditional books and composite books.

For the purposes of the present invention, the term "short stack" refers to sub-group of holograms within the address range of a book. For example, a book may be considered as a set of addresses that contain angles 1-500. This angular range may be further separated into "short stacks" so that short stack #1 contains angles 1-100, short stack #2 contains angles 101-200, etc.

For the purposes of the present invention, the term "composite book" refers to a book where at least some of the short stacks of the book do not occupy the same spatial location. In fact, it may be useful to "smear" out any optically induced distortions by placing short stacks in different spatial locations. In a composite book, the spatial locations of the short stacks may partially overlap one another, but differ enough spatially to mitigate any non-ideal media buildup due to multiple recordings in the same location.

For the purposes of the present invention, the term "beam block" refers to any device capable of absorbing light, such as, for example, an incident light beam.

For the purpose of the present invention, the term "waveplate" refers to any device that may be used to change the polarization of light. A waveplate is also sometimes referred to as a retarder and the terms may be used interchangeably herein. Exemplary waveplates, include a $\lambda/4$ waveplate (QWP) that may be used, for example, to cause a $\frac{1}{4}$ wavelength phase shift in a light beam that may result in changing linearly polarized light to circular and vice versa. Further, for example, a light beam twice passing through a $\lambda/4$ waveplate may undergo a 90 degree rotation in the linear polarization of the light.

For the purpose of the present invention, the term "device" may refer to an apparatus, a mechanism, equipment, machine, etc.

For the purpose of the present invention, the term "holographic storage device or system" refers to a device or system which may record (store) holographic data, which may read (recover) holographic data, or which may record (store) and read (recover) holographic data.

DESCRIPTION

In holographic data storage, there are many methods which may be used for recording multiplexed pages of data in the same location in the holographic storage medium. See, for example, U.S. Pat. No. 6,721,076 (King et al.), issued Apr. 13, 2004 (angle multiplexing), the entire disclosure and contents of which is hereby incorporated by reference. Among these methods, angle-polytopic multiplexing using a phase conjugate geometry for readout of data may be used to achieve higher capacity and faster transfer rates at the same time. See, for example, U.S. Pat. No. 7,092,133 (Anderson et al.), issued Aug. 15, 2006; Ken Anderson, et al, "High Speed Holographic Data Storage at 500 Gb/in2," *SMPTE Motion Imaging Journal*, May/June 2006 pp 200-20, the entire contents and disclosure of the foregoing documents being hereby incorporated by reference. In many multiplexing techniques such as angle-polytopic multiplexing, two beam paths may be used: an object (data) beam path and a reference beam path. But as the lenses shrink, the working distance for these optics becomes very small and it may be difficult to relay these beams into the holographic storage medium. Both the data beam path lens and the reference beam path lens may be competing for space as the lenses get smaller, the focal lengths shrink, etc., as the various components get as close as possible to the holographic storage medium.

One way of addressing this working distance problem in holographic storage architectures is to use a single lens for the two recording beams, namely the data beam and the reference beam. This allows the single lens to be parallel to the holographic storage medium which significantly improves the working distance problem, thus allowing the lenses to shrink in size even further. There have been many holographic storage architectures proposed for incorporating both the data (object) and reference beams through a single lens that focuses the combination onto or into the holographic storage medium. Most of these systems use correlation multiplexing (a complex reference beam) or shift multiplexing (a spherical reference beam). See, for example, U.S. Pat. No. 6,909,529 (Curtis), issued Jun. 21, 2005 (correlation multiplexing), Yukiko Nagasaka, et al., "Multiplexing Method with Non-Coaxial Spherical Waves for Holographic Data Storage" ISOM 2006, Th-I-28 (shift multiplexing), and U.S. Pat. No. 6,995,882 (Horimai), issued Feb. 7, 2006 (shift multiplexing). Correlation multiplexing and shift multiplexing may have some disadvantages in transfer rate, scatter, noise, and environmental effects (such as holographic storage medium expansion with temperature). Some of these methods also use reference beams that are not plane waves and/or not suitable for angle multiplexing.

Previously, single lens holography might use a multiplexing method that relies on the holographic storage medium to move between pages, but is often too slow to achieve reasonable transfer rates. In addition, the achievable numerical aperture (NA) that the data beam may use is limited and therefore the achievable density is limited to lower values. Also, while temperature compensation and interchange may be demonstrated with angle multiplexed holograms, it is much more difficult to achieve and still has not been achieved for multiplexing methods that rely on shifts between holograms to multiplexed holograms.

For these reasons, angle multiplexing has the advantage and benefit of being able to utilize fast mechanisms such as mechanically rotating mirrors or shifting lenses to accomplish fast page-to-page writes and reads. But prior attempts to use angle multiplexing with transmission of both beams through one objective lens do not use larger two-dimensional pages that may be required for high density or fast transfer rate which also require high numerical aperture (NA) optics. Combining angle and polytopic multiplexing with a single lens design and also utilizing phase conjugate reconstruction of multiple holograms for readout of the recorded data is, therefore, not obvious.

The present invention provides a novel and unobvious way of angle multiplexing, or combined angle and polytopic multiplexing for increased density storage, that provides the advantages and benefits of a single lens design while still retaining the advantages and benefits of traditional angle multiplexing, or angle-polytopic multiplexing. The present invention uses techniques that may be used to accomplish angle multiplexing or angle-polytopic multiplexing in a very simple architecture using smaller optics and simpler and faster mechanical mechanisms to accomplish the multiplexing. This architecture utilizes a single objective lens closer to the holographic storage medium to focus both the data beam and the reference beam into the holographic storage medium, e.g., a focal length of the lens in the range of from about 1 to about 7 mm, for example from about 1 to about 4 mm, and a working distance from the lens to the surface of the holographic storage medium in the range of from about 500 to about 3000 microns. It is thus possible to combine the benefits of angle multiplexing with the simplicity of single lens architectures. This architectural technique with phase conjugate reconstruction for data recovery is referred to hereafter as "monocular architecture." By using phase conjugation, a higher numerical lens may be used and therefore much higher storage density may be achieved. In monocular architecture, the reference beam shares part of the objective lens (also referred to interchangeably as the "object lens" or "storage lens") with the data beam. The incident angle of a focused reference beam through the objective lens is related to the distance, h, of the focused beam from the optical axis of the objective lens.

In monocular architecture, the distance h may be changed in several different ways and therefore produce a change in angle of the reference beam inside the holographic storage medium. One method that is used to change h is to produce h with a reference beam lens that dithers back and forth in direction in the plane of the desired angle change, as shown, for example, in the device or system of FIGS. 1 and 2, described in greater detail below. This dithering may be done very fast with, for example, a flexure mount, such as on a DVD or CD objective. This changes the location of the focus while the optical axis remains fixed. A second way that this angle may be changed is by changing h by leaving the focus point fixed while dithering the optical axis of the objective lens (see, for example, FIGS. 5 and 6, described in greater detail below). It is not obvious that this may be done because dithering the objective lens also changes the angle of the data beam. But it was discovered that this is not a problem and may actually provide some advantage and benefit from the perspective that it mitigates data beam correlational noise buildup since the data beam is constantly moving. It may also possible to use a galvo mirror or a Microelectromechanical Systems (MEMs) mirror to change the angle of the reference beam incident to the reference beam lens. This would form a standard four focal length with two lenses (4F) relay system.

According to one embodiment of the present invention, there is provided a holographic storage device or system comprising:
 a reference beam source for generating a reference beam;
 a data beam source for generating a data beam;
 an objective lens through which the data beam and reference beam pass prior to the entering a holographic storage medium; and
 an objective lens mover for moving the objective lens to thereby change the angle of the reference beam relative to the holographic storage medium, wherein the reference beam and data beam, after passing through the objective lens, interfere to record one or more data pages in the holographic storage medium.

According to another embodiment of the present invention, there is provided a holographic storage device or system comprising:
 a reference beam source for generating a reference beam;
 a data beam source for generating a data beam;
 an objective lens through which the data beam and reference beam pass prior to the entering a holographic storage medium;
 a reference beam lens through which the reference beam passes; and
 a reference beam lens mover for moving the reference beam lens to thereby change the angle of the reference beam relative to the holographic storage medium, wherein the reference beam and data beam, after passing through the objective lens, interfere to record one or more data pages in the holographic storage medium.

According to another embodiment of the present invention, there is provided a method comprising the following steps:
 (a) transmitting a reference beam through a reference beam lens;
 (b) recording one or more data pages in a holographic storage medium by interfering the focused reference beam and a data beam after the reference beam and a data beam have passed through the same objective lens; and
 (c) moving the reference beam lens relative to the objective lens to thereby change the angle of incidence of the reference beam on the holographic storage medium.

According to another embodiment of the present invention, there is provided a holographic storage device or system comprising:
 an objective lens located on one side of a holographic storage medium;
 a reflective device located on an opposite side of the holographic storage medium;
 a phase conjugate optical system;

an objective lens through which a reconstruction beam passes prior to the entering the holographic storage medium; and a reconstruction beam source for generating a reconstruction beam, wherein the reconstruction beam is directed along a reconstruction beam path that passes through the objective lens, through the holographic storage medium, and is directed by the reflective device back through the holographic storage medium to the phase conjugate optical system, wherein the phase conjugate optical system generates a phase conjugate beam from the reconstruction beam, and wherein the phase conjugate beam is directed through the holographic storage medium to form a recovered beam from one or more data pages stored in the holographic storage medium.

According to another embodiment of the present invention, there is provided a method comprising the following steps:

(a) transmitting a reconstruction beam along a reconstruction beam path that: (i) passes through an objective lens before entering a first side of a holographic storage medium having one or more data pages stored therein, (ii) passes through the holographic storage medium, and (iii) is directed by a reflection device facing an opposite side of the holographic storage medium back through the holographic storage medium towards a phase conjugate optical system located opposite the first side of the holographic storage medium to generate a phase conjugate beam; and (b) controlling the phase conjugate system to direct the phase conjugate beam through holographic storage medium to thereby recover a selected data page of the one or more data pages stored in the holographic storage medium.

According to another embodiment of the present invention, there is provided a holographic storage device or system comprising:

an objective lens located on one side of a recording material layer of a holographic storage medium;

a phase conjugate optical system located on an opposite side of the recording material layer;

an objective lens through which a reconstruction beam passes prior to the entering the holographic storage medium; and a reconstruction beam source for generating a reconstruction beam, wherein the reconstruction beam is directed along a reconstruction beam path that passes through the objective lens and through the recording material layer toward the phase conjugate optical system, wherein the phase conjugate optical system generates a phase conjugate beam from the reconstruction beam, and wherein the phase conjugate beam is directed through the holographic storage medium to form a recovered beam from one or more data pages stored in the recording material layer.

According to another embodiment of the present invention, there is provided a method comprising the following steps:

(a) transmitting a reconstruction beam along a reconstruction beam path that: (i) enters a first side of a recording material layer of a holographic storage medium having one or more data pages stored therein, and (ii) passes through the recording material layer towards a phase conjugate optical system located opposite the first side of the recording material layer; and (b) controlling the phase conjugate system to generate and direct a phase conjugate beam towards the recording material layer to thereby recover a selected data page of the one or more data pages stored in the recording material layer.

According to another embodiment of the present invention, there is provided an article comprising holographic storage medium comprising:

a recording material layer for recording one or more data pages;

a variable beam transmission layer underneath the recording material layer which absorbs light when one or more data pages are being recorded in the recording material layer, and which allows light beams to pass through when one or more data pages recorded in the recording material layer are being recovered therefrom; and a reflective layer underneath the variable layer for reflecting light beams passed by the variable layer to thereby create a phase conjugate beam.

According to another embodiment of the present invention, there is provided an article comprising holographic storage medium comprising:

a recording material layer for recording one or more data pages; and a variable beam reflective layer underneath the recording material layer which passes light beams when one or more data pages are being recorded in the recording material layer, and which reflects light beams to thereby create a phase conjugate beam when one or more data pages recorded in the recording material layer are being recovered therefrom.

Figure 2:
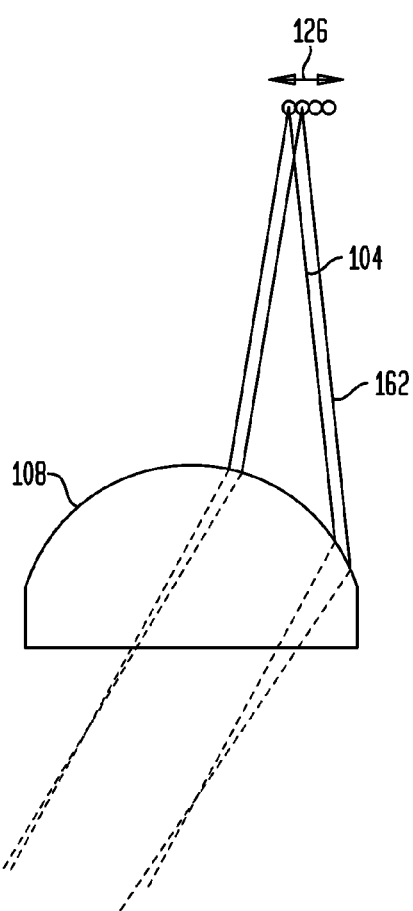
FIG. 2 is a schematic view illustrating dithering of the reference beam in the device or system of FIG. 1.

For example, FIGS. 1 and 2 show a monocular holographic storage device or system 102 according to one embodiment of the present invention (illustrating data storage but which may also be used for data recovery). Device or system 102 includes a reference beam 104, a data beam represented by an inner pixel wave front 106 (hereafter referred to as inner data beam portion 106) and an outer pixel wave front 107 (hereafter referred to as outer data beam portion 107), an objective lens 108 (which may also be referred to interchangeably as an "object lens" or "storage lens") and a holographic storage medium 110. Between objective lens 108 and holographic storage medium 110 is an air gap 114. A reference beam lens 122 focuses reference beam 104 on the back focal plane of objective lens 108. Reference beam lens 122 has an optical axis 124. Reference beam lens 122 is moved in a direction shown by two-headed arrow 126 parallel to upper surface 128 of holographic storage medium 110. Inner data beam portion 106 and outer data beam portion 107 are angled by objective lens 108 to form, respectively, an angled inner data beam 132 portion and an angled outer data beam portion 134 that are relayed into holographic storage medium 110 as plane waves and overlap in generally diamond-shaped region 136. Holographic storage system 102 also includes an SLM 142, a camera 144, a polarizing beam splitter (PBS) 146, and a polytopic filter coating 148 on PBS 146. SLM 142 and PBS 146 are shown in FIG. 1 as being positioned between reference beam lens 122 and objective lens 108. Holographic storage medium 110 includes a lower substrate 152, a recording material 154 and an upper substrate 156. Objective lens 108 takes the Fourier transform of data beam portions 106 and 107 off of SLM 142. While polytopic filter coating 148 is shown in FIG. 1 as being on PBS 146, coating 148 may also be on or part of the objective lens 108, or on camera 144 and/or SLM 142. See also U.S. Prov. App. No. 60/907,445, entitled "NON-FT PLANE POLYTOPIC FILTERS," filed Apr. 2, 2007, the entire disclosure and contents of which is hereby incorporated by reference, for suitable materials for coating 148 or for polytopic filtering without using standard relay lenses and apertures. By moving reference beam lens 122 as shown by arrow 126, reference beam 104 is dithered to form a dithered reference beam 162 which becomes angled dithered reference beam 164 (shown by dashed lines) after passing through objective lens 108 and may be used for multiplexing storage (and recovery) of data. Angled dithered beam 164 is relayed into holographic storage medium 110 as a plane wave and overlaps and interferes with angled data beam portions 132 and 134 in larger region 166 (which includes overlap region 136) to form holograms (e.g., data pages) which are recorded in recording material 154 of holographic storage medium 110. Angled inner data beam portion 132 has an angle of incidence 174 on holographic storage medium 110. Angled dithered reference beam 164 has an angle of incidence 184 on holographic storage medium 110. Optical axis 124 of reference beam lens 122 is a distance 188 from optical axis 178 of objective lens 108 (i.e., distance 188 corresponds to the distance, h, described above). Arrow 196 shows direction of a light beam which is incident on PBS 146 and which illuminates the entire SLM 142 and generates the data beam which includes portions represented by 106 and 107.

The monocular holographic storage device or system shown in FIGS. 1 and 2 allows minimizing the size of the holographic optical head by allowing the data beam and the reference beam to share the same objective lens. In the device or system of FIGS. 1 and 2, the reference beam is generated by focusing the reference beam onto the same plane as the SLM but slightly offset in position from the SLM pixels. The focused reference beam is turned into a plane wave at the holographic storage medium by the larger objective lens. By dithering the objective lens in one dimension with a similar mechanism to a DVD lens actuator, the positional shift in focus is turned into an angular change at the holographic storage medium. Using a high numerical aperture (NA) objective lens (e.g., a numerical aperture of at least about 0.85 with a focal length of 4 mm), a lens shift in the range of about 1 mm may create up to about a 25 degree angular change in the reference beam. By using a very high numerical aperture, the numerical aperture (angles) used by the data beam may be kept very high (i.e., many pixels) which may be needed to get to higher densities and transfer rates. The size of the reference beam in the holographic storage medium may be determined by the numerical aperture of the dithering lens and may be easily modified to give different beam sizes. An additional benefit of this technique is that a Bragg degenerate correction may be easily generated by a slight lens offset into or out of the page.

This monocular architecture may significantly simplify the holographic storage device or system layout or configuration, but may require that the objective lens be able to produce a high quality plane wave at the outside edge of the objective lens for good phase conjugation. In addition, there may not be complete overlap between the reference and data beam and this may cause some degradation in the signal to noise ratio (SNR) of the holograms. The size of the reference beam may need to be optimized for best overlap and minimal waste of the holographic storage medium. The size is determined by the NA of reference beam at its focal point (as related to reference beam lens).

Figure 3:
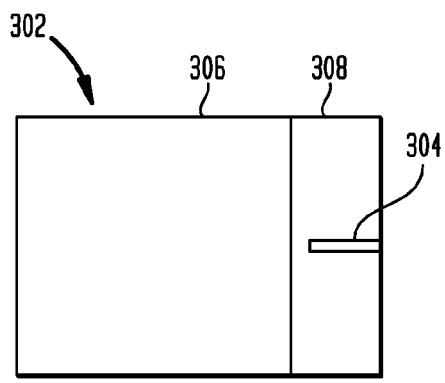
FIG. 3 is a rectangular cross-section of an SLM that may be used in the device or system of FIG. 1.
Figure 4:
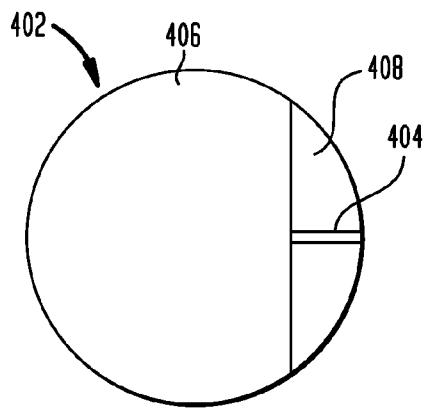
FIG. 4 is a circular cross-section of an alternate SLM that may be used in the device or system of FIG. 1.

FIG. 3 shows a rectangular cross-section of SLM 302 that may be used in the device or system of FIG. 1. SLM 302 includes an absorbing or non transmitting (e.g., mirrored) surface 308 with a channel 304 in surface 308 for the reference beam focus to pass through, with 306 indicating the part of SLM 302 used for displaying data. FIG. 4 shows a circular cross-section of an alternate SLM 402 where only the portion that may adequately pass through the objective lens is used (i.e., a circular field of view). SLM 402 includes an absorbing or non transmitting (e.g., mirrored) surface 408 with a channel 404 in surface 408 for the reference beam focus to pass through, with 406 indicating the part of SLM 402 used for displaying data.

Figure 5:
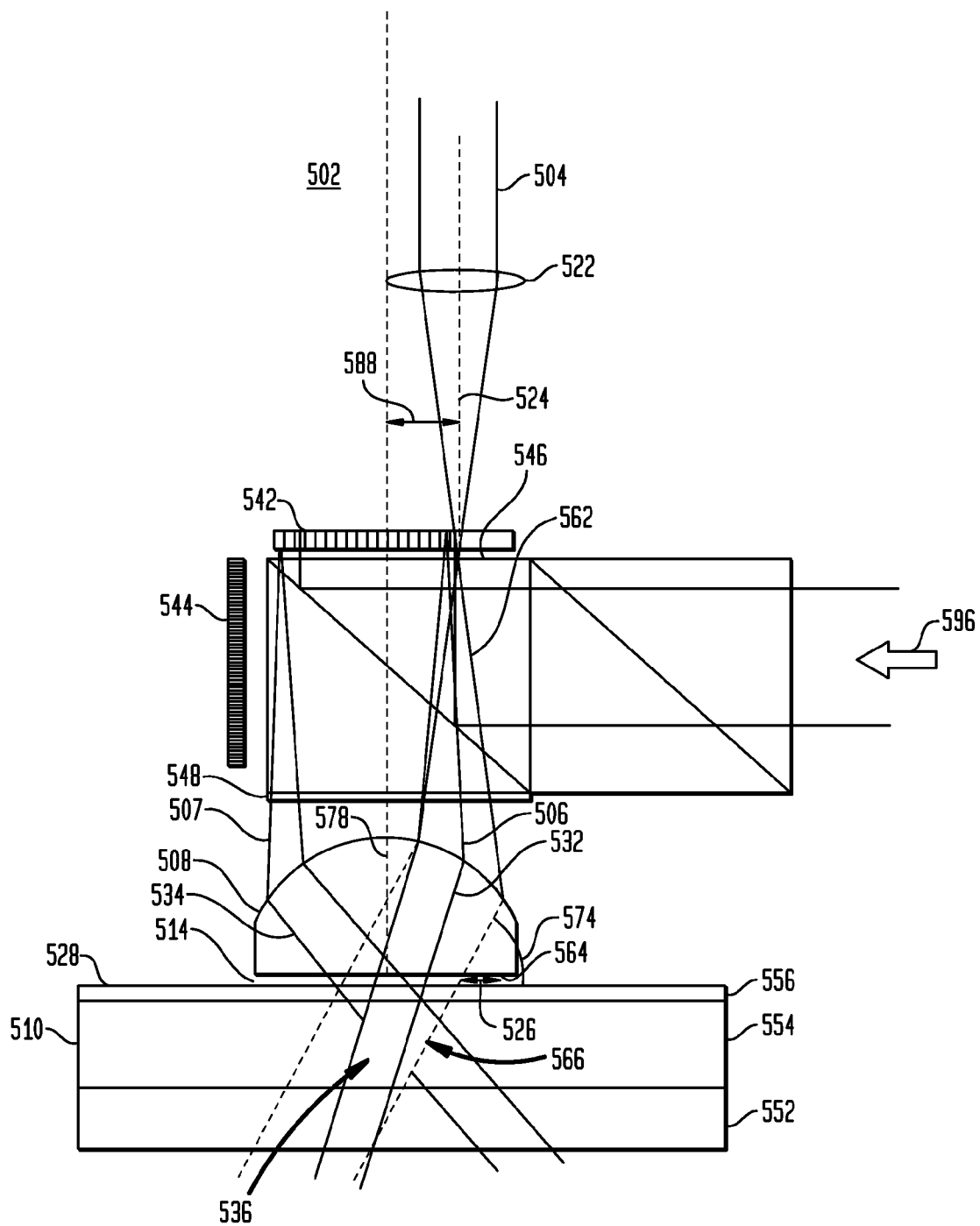
FIG. 5 is schematic view illustrating data storage in a monocular holographic storage device and system using a moving objective lens to create an angularly multiplexed beam.

A second monocular method may be accomplished by leaving the reference beam focus at the same location and dithering the objective lens as shown in FIGS. 5 and 6. This produces the same angular deviation of the reference beam as the previous architecture shown in, for example, the embodiment of FIGS. 1 and 2. But in the case of the embodiment of FIGS. 5 and 6, the data beam angles also change as a function of the objective lens position. The overall result is the same or similar, and thus puts the multiplexing movement completely into the objective lens. This movement would be the identical or similar to the movement required in a CD or DVD objective lens. Because the recovered holograms may be shifted on the detector, clear over-sampled detection may be required.

FIGS. 5 and 6 show a monocular holographic storage device or system 502 according to one embodiment of the present invention (illustrating data storage but which may also be used for data recovery). Device or system 502 includes a reference beam 504, a data beam represented by an inner pixel wave front 506 (hereafter referred to as inner data beam portion 506) and an outer pixel wave front 507 (hereafter referred to as outer data beam portion 507), an objective lens 508 and a holographic storage medium 510. Between objective lens 508 and holographic storage medium 510 is an air gap 514. A reference beam lens 522 focuses reference beam 504 on the back focal plane of objective lens 508. Reference beam lens 522 has an optical axis 524. Objective lens 508 is moved, as shown by two-headed arrow 526, in a direction parallel to upper surface 528 of holographic storage medium 510. Inner data beam portion 506 and outer data beam portion 507 are angled by objective lens 108 to form, respectively, an angled inner data beam 532 portion and an angled outer data beam portion 534 that are relayed into holographic storage medium 510 as plane waves and overlap in generally diamond-shaped region 536. Holographic storage system 502 also includes an SLM 542, a camera 544, a polarizing beam splitter (PBS) 546, and a polytopic filter coating 548 on PBS 542. SLM 542 and PBS 546 are shown in FIG. 1 as being positioned between reference beam lens 522 and objective lens 508. Holographic storage medium 510 includes a lower substrate 552, a recording material 554 and an upper substrate 556. Objective lens 508 takes the Fourier transform of data beam portions 506 and 507 off of SLM 542. While polytopic filter coating 548 is shown in FIG. 5 as being on PBS 546, coating 543 may also be on or part of the objective lens 508, or on camera 544 and/or SLM 542. See also U.S. Prov. App. No. 60/907,445, entitled "NON-FT PLANE POLYTOPIC FILTERS," filed Apr. 2, 2007, the entire disclosure and contents of which is hereby incorporated by reference, for suitable materials for coating 548 or for polytopic filtering without using standard relay lenses and apertures. By moving objective lens 508 as shown by arrow 526, reference beam 504 is dithered to form a dithered reference beam 562 which becomes angled dithered reference beam 564 (shown by dashed lines) after passing through objective lens 508 and is used for multiplexing storage (and recovery) of data. Angled dithered reference beam 564 is relayed into holographic storage medium 510 as a plane wave and overlaps and interferes with angled data beam portions 532 and 534 in larger region 566 (which includes overlap region 536). Angled dithered reference beam 564 has an angle of incidence 574 on holographic storage medium 510. Optical axis 524 of reference beam lens 522 is a distance 588 from optical axis 578 of objective lens 508 (i.e., the distance 588 corresponds to the distance, h, described above). Arrow 596 shows the direction of a light beam which is incident on PBS 546 and which illuminates the entire SLM 542 and generates the data beam which includes portions represented by 506 and 507.

While the embodiment shown in FIGS. 5 and 6 further simplifies the layout or configuration of the holographic device or system, it also adds slightly more to the complexity of the objective lens. In this case, it may require the objective lens to be designed such that there is a minimum amount of position sensitivity in the objective lens such that the reconstructed image (data) does not become aberrated by propagating through a different part of the lens than it was recorded from. This effect is only a secondary effect, because, for the most part, there will only be a minimal shift necessary that comes from any offset between the reference beam and the data beam that comes from shrinkage or thermal expansion.

FIG. 7 is circular cross-section of an SLM 702 which may be used in the device or system of FIG. 5 where only the portion that may adequately pass through the objective lens is used (i.e., a circular field of view). SLM 702 includes an absorbing or non transmitting (e.g., mirrored) surface 708 with a channel 704 in surface 706 for the reference beam focus to pass through, with 706 indicating the part of SLM 702 used for displaying data.

Figure 8:
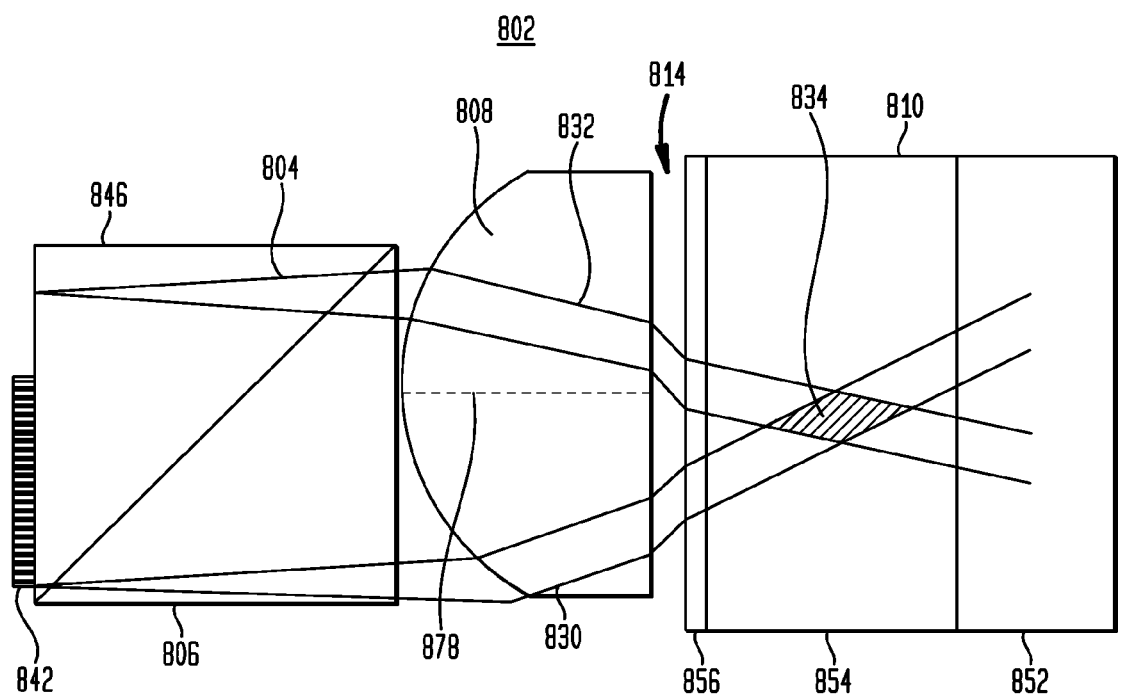
FIG. 8 is a schematic diagram illustrating data storage by a holographic storage device or system that has minimal overlap of the reference beam and data beam.

The overlap between the data and reference beams may be important to the performance of a holographic data storage system. Improper overlap may result in loss of diffraction efficiency and a broadening of Bragg selectivity and therefore a loss in density/capacity. FIG. 8 illustrates this beam overlap when the data beam (external pixel) and reference beam size are identical. FIG. 8 shows part of a monocular holographic storage system 802 (illustrating data storage) which includes reference beam 804, data beam 806 (represented as the outer most pixel wave front on the SLM 842), an objective lens 808 and a holographic storage medium 810. Between objective lens 808 and holographic storage medium 810 is an air gap 814. Reference beam 804 and data beam 806 are relayed into holographic storage medium 810 as plane waves 830 and 832 and overlap and interfere in region 834 to form holograms (e.g. data pages) which are recorded in recording material 854 of holographic storage medium 810. Holographic storage system 802 also includes an SLM 842 and a polarizing beam splitter (PBS) 846. Holographic storage medium 810 includes a lower substrate 852, a recording material 854 and an upper substrate 856. Objective lens 808 has an optical axis 878. Objective lens 808 takes the Fourier transform of data beam 806 off of SLM 842. A polytopic filter may be in objective lens 808, on camera 844 and/or SLM 842, or on PBS 846.

In FIG. 8, the reference beam may be too small to completely overlap the farthest pixel that makes up the data beam. This pixel is used because it represents the worst case overlap between a data beam pixel and the reference beam. Data beam pixels closer to the reference beam will have better overlap. Better beam overlap may be achieved by making the reference beam wider, but this may affect many system parameters such as SLM size, reference beam location, lens performance, etc. To optimize the reference beam size and improve the resulting effects, it is easiest to start with complete beam overlap and work backwards from there.

Figure 9:
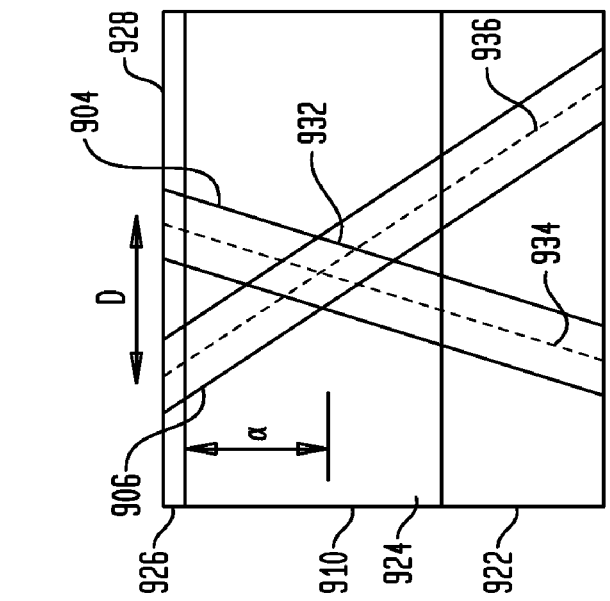
FIG. 9 is a schematic diagram illustrating data storage by a holographic storage device or system showing the overlap between a reference beam and a data beam having the same width.

For example, FIG. 9 schematically illustrates data storage by a holographic storage device or system having smaller data and reference beam overlap similar to FIG. 8. FIG. 9 shows a reference beam 904, a data beam 906 and a holographic storage medium 910. Reference beam 904 and data beam 906 are shown as having the same diameter. Holographic storage medium 910 includes a lower substrate 922, a recording material 924, an upper substrate 926, and upper surface 928. Reference beam 904 and data beam 906 overlap and interfere with each other in a recording region 932 in recording material 924. Reference beam 904 has an optical axis 934 and data beam 906 has an optical axis 936.

Figure 10:
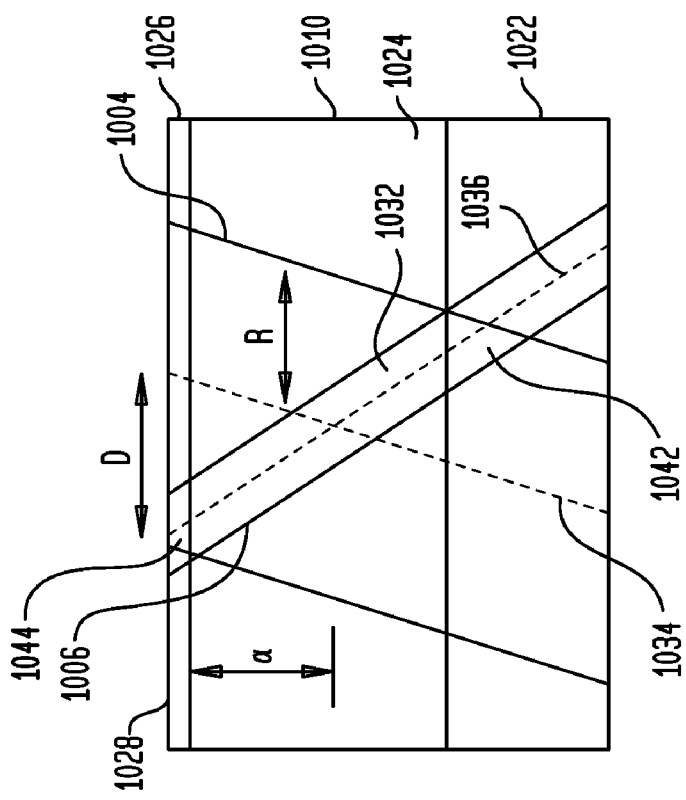
FIG. 10 is a schematic diagram illustrating data storage by a holographic storage device or system showing the overlap between a reference beam and data beam where the reference beam is wider than the data beam.

By contrast, FIG. 10 illustrates data storage by a holographic storage device or system having greater beam overlap with a broader (wider) reference beam. FIG. 10 shows a reference beam 1004, a data beam 1006 and a holographic storage medium 1010. Reference beam 1004 has a larger diameter than data beam 906. (Factors affecting the diameter of reference beam 1004 may include the numerical aperture of the reference lens, the focal length of the objective lens or beam divergence in the reference beam path, etc.) Holographic storage medium 1010 includes a lower substrate 1022, a recording material 1024, an upper substrate 1026, and an upper surface 1028. Reference beam 1004 and data beam 1006 overlap and interfere with each other in an overlap recording region 1032 in recording material 1024. Reference beam 1004 has an optical axis 1034 and data beam 1006 has an optical axis 1036.

In FIGS. 9 and 10, D is the distance between the optical axes of the reference beam and data beam at the upper surface of the holographic recording medium, R is the distance from the optical axis of the reference beam to the edge of the reference beam in a plane parallel at the upper surface of the recording material, and α is the distance from the top of the recording material to the plane where the optical axes of the reference beam and data beam intersect. As can be seen by comparing FIG. 10 to FIG. 9, because reference beam 1004 is wider than reference beam 904, overlap recording region 1032 is larger than overlap recording region 932. Also, as can be seen in FIG. 10, reference beam 1004 and data beam 1006 additionally overlap in non-recording overlap regions 1042 and 1044 in lower substrate 1022 and upper substrate 1026, respectively.

Once the required radius of the reference beam is known, it is important to determine how this larger size affects the size of the SLM and the position of the reference beam with respect to the SLM. The major effect comes from the fact that the reference beam size may need to be taken into account when determining the angular bandwidth (how fast it expands) of the reference beam as the focus position is always at the SLM plane for the reference beam to be a plane wave. This effect may be illustrated in FIG. 11.

Figure 11:
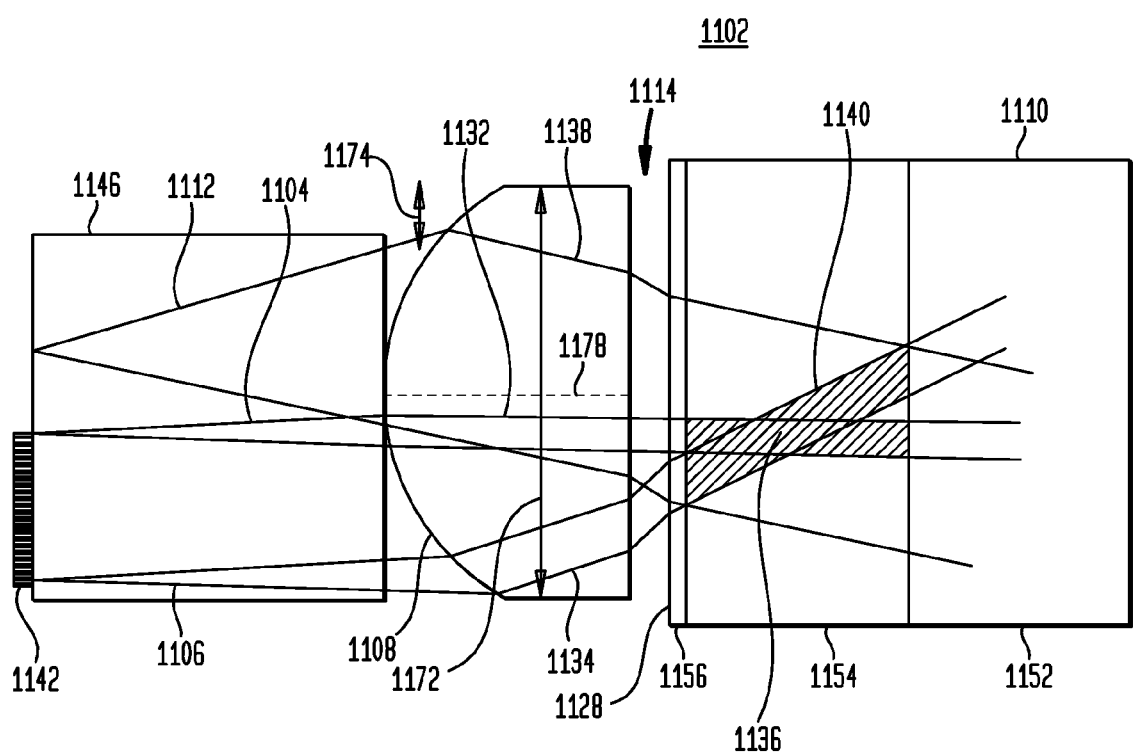
FIG. 11 is schematic diagram illustrating data storage by a holographic storage device or system in accordance with one embodiment of the present invention showing the overlap regions between a wider reference beam and inner and outer portions of the data beam.

FIG. 11 illustrates data storage by a monocular holographic storage device or system 1102 according to one embodiment of the present invention. Device or system 1102 includes a data beam represented by an inner pixel wave front 1104 (hereafter referred to as inner data beam portion 1104) and an outer pixel wave front 1106 (hereafter referred to as outer data beam portion 1106), an objective lens 1108, a holographic storage medium 1110, and a wide reference beam 1112. Between objective lens 1108 and holographic storage medium 1110 is an air gap 1114. Holographic storage medium includes an upper surface 1128. Inner data beam portion 1104 and outer data beam portion 1106 are angled by objective lens 1108 to form, respectively, angled inner data beam portion 1132 and angled outer data beam portion 1134 which are relayed into holographic storage medium 1110 as plane waves and overlap in generally diamond-shaped region 1136. Wide reference beam 1112 is angled by objective lens 1108 to form an angled wide reference beam 1138 which is relayed as a plane wave into holographic storage medium 1110 and overlaps and interferes with angled data beam portions 1132 and 1134 in generally X-shaped region 1140. Holographic storage device or system 1102 also includes an SLM 1142 and a polarizing beam splitter (PBS) 1146. Holographic storage medium 1110 includes a lower substrate 1152, a recording material 1154 and an upper substrate 1156. Objective lens 1108 takes the Fourier transform of data beam portions 1104 and 1106 off of SLM 1142. A polytopic filter may be in objective lens 1108, on camera 1144 and/or SLM 1142, or on PBS 1146. Double-headed arrow 1172 shows the width of objective lens 1108. Double-headed arrow 1174 shows the distance in a plane parallel to upper surface 1128 from the edge of objective lens 1102 to the point where wide reference beam 1112 enters objective lens 1110. Objective lens 1102 has an optical axis 1178.

In one embodiment of the present invention the width of the objective lens (e.g., lens 1108 in FIG. 11) may be about 5 mm, for example, in the range of from about 1 to about 20 mm. There may be a tradeoff in reference beam size and angular multiplexing range and data beam size (number of pixels). This is due to the limited bandwidth of the objective lens even for very high NA lenses such as a numerical aperture of about 0.65 or higher, for example, NA lenses which have a numerical aperture of about 0.85 or higher which are attractive in allowing very large data pages (e.g. data pages sizes larger than 256×256 pixels, for example 1200×600 pixels) and large angle sweeps for the reference beam. In addition, in addition, these very high NA lenses are have the same NA as used in Blu-ray™ disk products (described below) which may allow for greater compatibility between systems.

Figure 12:
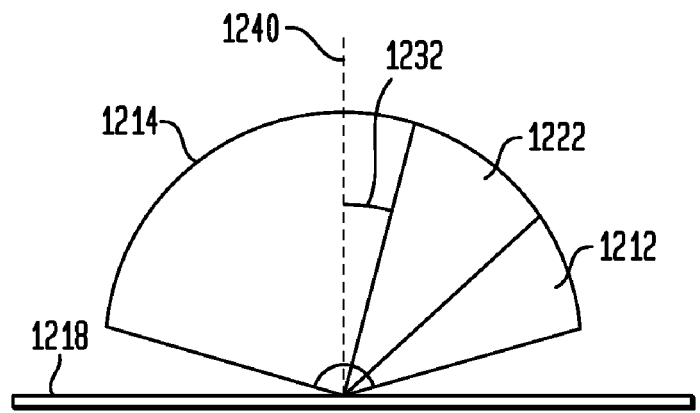
FIG. 12 is an angular space representation of data beams and reference beams where the objective lens is at an extreme position.
Figure 13:
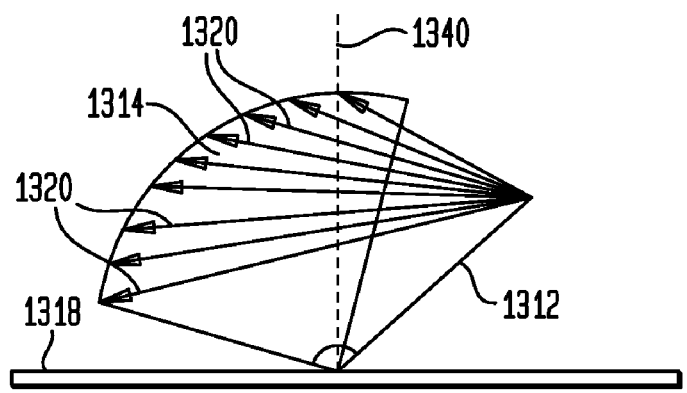
FIG. 13 is an angular space representation of data beams and reference beams where showing the grating vectors.
Figure 14:
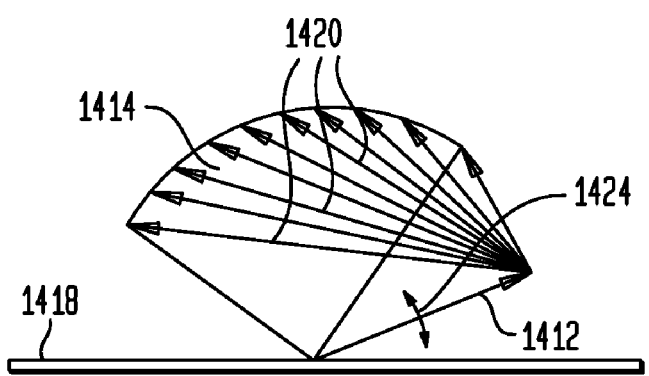
FIG. 14 is an angular space representation of data beams and different reference beam angles from those in FIG. 13 showing the grating vectors.

FIGS. 12, 13 and 14 illustrate how the angles of the data beam and the reference beam at the holographic storage medium change with monocular dithering of the objective lens or the reference beam lens upstream of the objective lens, or changing the incident angle into the reference beam lens by changing, for example, the mirror tilt. FIG. 12 is an angular space representation of data beams and reference beams where the objective lens is at an extreme position. Reference beam angles are shown in region 1212 and data beam angles are shown in region 1214 relative to holographic storage medium surface 1218. Region 1222 represents a dead space. Angle 1232 represents the minimum angle of the data beam relative to axis 1240 normal to the plane of holographic storage medium surface 1218.

FIG. 13 is an angular space representation of data beams and reference beams showing the grating vectors. A reference beam vector is represented by arrow 1312 with various data beam grating angles being shown in region 1314 relative to holographic storage medium surface 1318. The holographic grating vectors are represented by arrows 1320 between the reference beam 1312 and all the plane wave components (one for each pixel) in data beam 1314. The axis 1340 normal to the plane of holographic storage medium surface 1318 is also shown.

FIG. 14 is an angular space representation of data beams and different reference beam angles from those in FIG. 13 showing the grating vectors. A reference beam vector is represented by arrow 1412 with various data beam grating angles being shown in region 1414 relative to holographic storage medium surface 1418. The holographic grating vectors are represented by arrows 1420 between the reference beam 1412 and all the plane wave components (one for each pixel) in data beam 1414. It should be noted that these spectrum of grating vectors 1420 are different from those shown in FIG. 13 for a different reference angle location. Thus the Bragg selectivity will separate these two holograms. The reference beam angular range is indicated by angular sweep 1424.

In some embodiments of the present invention, in addition to dithering the lenses (i.e., reference beam lens, objective lens or both), the reference beam lens or objective lens may be moved in a direction parallel to the optical axis of the objective lens (commonly called the "focus direction"), thereby generating a diverging or converging reference beam at the holographic storage medium that may be used to compensate for page focus, magnification, shift, other system or medium changes, etc.

In other embodiments, the reference beam angle at the upper surface of the holographic storage medium may be changed to compensate for tilt of the holographic storage medium in a radial or tangential direction. The reference beam and/or objective lens movement may be in a direction parallel to holographic storage medium and in a direction orthogonal to the optical axis of the objective lens and the multiplexing direction. Also, the reference beam or objective lens may be moved in one direction and the holographic storage medium may be moved in a different direction. The change in the angle of the reference beam parallel or in a plane perpendicular to the optical axis of the objective lens may be used to compensate for tilting of the holographic storage medium, tilts in the holographic storage medium, or tilt errors in the holographic drive device relative to the holographic storage medium.

In yet other embodiments of the present invention, changing the angle and the wavelength of the reference beam may be used to compensate for temperature changes. See U.S. Pat. No. 6,348,983 (Curtis et al.), issued Feb. 19, 2002 and in an article by Alan Hoskins, et al., "Temperature Compensation Strategy for Holographic Storage," ODS 2006, Apr. 23-36, 2006, the entire contents and disclosure of the foregoing patent and article being hereby incorporated by reference.

In one embodiment of the present invention, there is also a provided one or more methods for reading (recovering) data from a monocular holographic storage device or system where data is stored, as described above.

For consumer products, size may be a very important factor in the market, as well as in producing an inexpensive data storage and/or recovery device or system. Therefore, in order to achieve compact optics, it may be desirable that most of the holographic drive components and electronics be kept together on the same side of the holographic storage medium, such as by using phase conjugate readout geometries for data recovery. Phase conjugate readout geometries may involve using galvo mirrors on the back side of the holographic storage medium to fold the reference (reconstruction) beam back for data recovery. See, for example, U.S. Published Application No. 2006/0279823 (Riley et al.), published Dec. 14, 2006, the entire contents and disclosure of which is hereby incorporated by reference. Because this galvo mirror rotates, it may retro-reflect (phase conjugate) the different plane waves used to angularly multiplex the holograms.

Embodiments of the holographic storage device or system of the present invention may use phase conjugate geometries involving galvo mirrors on the back side of the holographic storage medium to fold the reference beam back for data recovery, such as those described in U.S. Published Application No. 2006/0279823 (Riley et al.), published Dec. 14, 2006. But these phase conjugate geometries involving phase conjugator galvo mirrors may prevent or make it difficult to achieve compact optics. For this reason, some embodiments of the present invention relate to other phase conjugate readout geometries to make the optics of the device or system more compact.

Embodiments of monocular holographic storage devices or systems of the present invention involving phase conjugate geometries for data recovery that may provide more compact optics are shown and described below in FIGS. 16-29. The objective lens in these various embodiments may be moved (e.g. dithered) in the various ways described above in, for example, the data storage devices or systems of FIGS. 1-7, to change the angle of the reference beam entering the holographic storage medium. Also, although not shown in FIGS. 16-29 as described below, each of these devices or systems may include a reference beam lens that may be moved (e.g., dithered) to change the angle of the reference beam entering the holographic storage medium. Also, for simplicity of illustration, in the devices or systems of FIGS. 16-28 many conventional data storage device/system and data recovery device/system features such as spatial light modulators, beam splitters, detector arrays, reference beam generating systems, data beam generating systems, cure/erase systems, additional lenses, additional mirrors, laser sources, collimators, etc. are not shown but may be part of these devices or systems, as shown in the device or system of, for example, FIG. 29. In addition, the reference beam angle may be changed by changing the incident angle of the reference beam into the reference beam lens by rotating or translating a mirror or MEMs reflector, etc.

Figure 15:
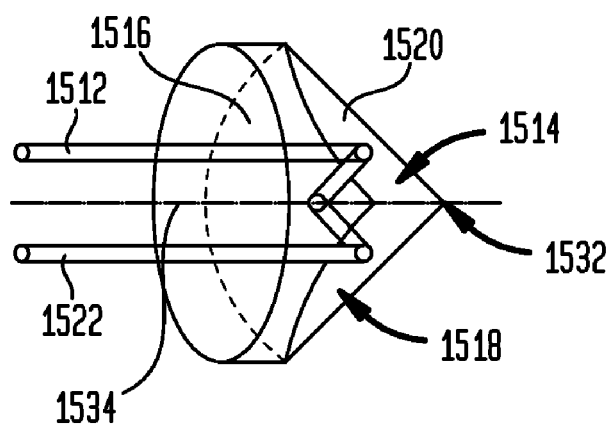
FIG. 15 is a schematic view of an effect of a corner cube on an incident light beam.

In one embodiment of the holographic storage device or system of the present invention using a phase conjugate geometry for data recovery, a corner cube may be used for phase conjugation. A corner cube is an optical device that has the shaped of part of a cube with three mutually-perpendicular reflecting surfaces. Such optical devices have the ability to reflect (direct) a beam of any incident angle in a direction parallel to the incident beam after reflecting three times inside the corner cube, as illustrated in FIG. 15. FIG. 15 shows an incident beam 1512 that reflects off three walls 1514, 1516 and 1518 of a corner cube 1520 before exiting corner cube 1520 as a reflected (directed) beam 1522 that is parallel to incident beam 1512. Corner cube 1520 has a center point 1532 and an optical axis 1534.

Figure 16:
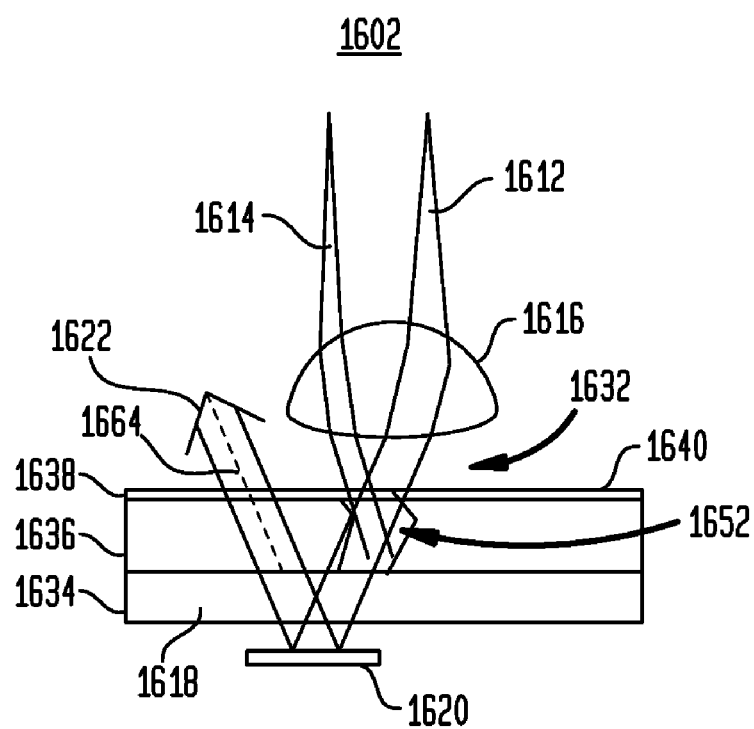
FIG. 16 is a schematic diagram illustrating data recovery by a monocular holographic storage device and system according to one embodiment of the present invention using the corner cube of FIG. 15 in a phase conjugate geometry.

FIG. 16 shows a monocular holographic storage device or system 1602 according to one embodiment of the present invention using a corner cube (such as that of FIG. 15) in a phase conjugate geometry illustrating data recovery (but where device or system 1602 may also be used to store the data that is recovered). Holographic storage device or system 1602 includes a reference beam 1612 (also referred to as a reconstruction beam when used for data recovery), a representative portion of recovered beam 1614 (the recovered beam in its entirety being able to reconstruct all of the data stored), an objective lens 1616, a holographic storage medium 1618, a reflective layer 1620 and a corner cube 1622. There is an air gap 1632 between objective lens 1616 and holographic storage medium 1618. Holographic storage medium 16/8 includes a lower substrate 1634, a recording material 1636, an upper substrate 1638 and an upper surface 1640. Holographic storage device or system 1602 allows a data page 1652 stored in recording material 1636 to be recovered (read) as recovered beam 1614. Corner cube 1622 has a center 1662 and an optical axis 1664. Although only a single data page 1652 is illustrated as being recovered in FIG. 16, holographic storage device or system 1602 of FIG. 16 may be used to recover all of the data pages stored in recording material 1636 of holographic storage medium 1618.

In the holographic storage device or system of FIG. 16, a mirror or reflective layer (reflective layer) 1620 may be placed on the back side of the storage medium, inside the storage medium, or under the back side of the storage medium in the holographic drive device to reflect (direct) reference (reconstruction) beam 1612 to the front side of holographic storage medium 1618 and towards corner cube 1622 placed on the front side of medium 1618. In this phase conjugate geometry, readout is performed with the reference (reconstruction) beam reflected (directed) by reflective layer 1620 and corner cube 1622. The pivot point of reference (reconstruction) beam 1612 in changing the reference (reconstruction) beam angle for angular multiplexing is set on the center of corner cube 1622. By making the reference (reconstruction) beam directed from reflective layer 1620 illuminate the center of corner cube 1622, the reference (reconstruction) beam is reflected (directed) back in the opposite direction without any displacement. That is to say, this optical layout or configuration shown in FIG. 16 may achieve phase conjugation. FIG. 16 illustrates a single pixel reconstruction, but may be extended to page-wise storage and readout of multiple bits at a time. Holographic data storage devices or systems that record and recover 1.3-1.4 million bits at a time (such as those described in the documents cited above) may be adapted or modified to provide a phase conjugate readout geometry using a corner cube such as 1622 shown in FIG. 16.

Figure 17:
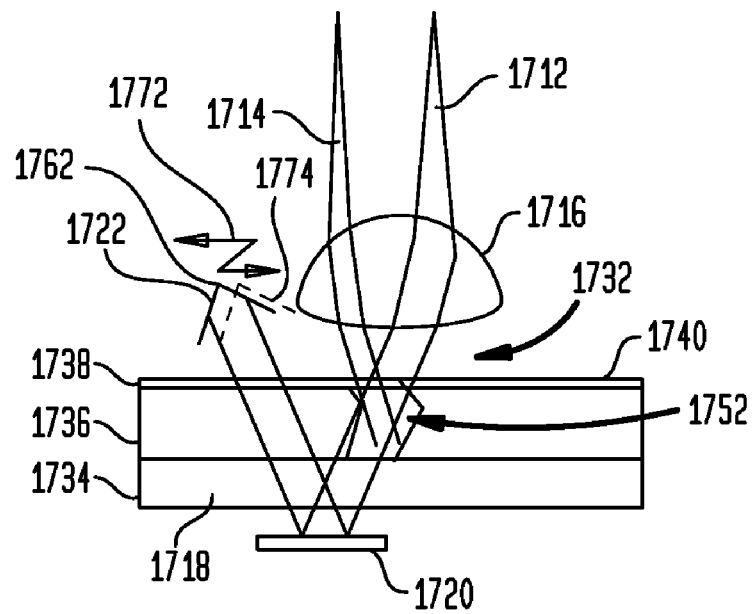
FIG. 17 is a schematic diagram illustrating data recovery by a monocular holographic storage device and system according to one embodiment of the present invention using the corner cube of FIG. 15 in a different phase conjugate geometry.

FIG. 17 shows a monocular holographic storage device or system 1702 according to one embodiment of the present invention using a corner cube (such as that of FIG. 15) in a different phase conjugate geometry illustrating data recovery (but where device or system 1702 may also be used to store the data that is recovered). Holographic storage device or system 1702 includes a reference beam 1712 (also referred to as a reconstruction beam when used for data recovery), a representative portion of recovered beam 1714, an objective lens 1716, a holographic storage medium 1718, a reflective layer 1720 and a corner cube 1722. There is an air gap 1732 between objective lens 1716 and holographic storage medium 1718. Holographic storage medium 1718 includes a lower substrate 1734, a recording material 1736, an upper substrate 1738 and an upper surface 1740. Holographic storage device or system 1702 allows a data page 1752 stored in recording material 1736 to be recovered (read) as recovered beam 1714. Corner cube 1722 has a center 1762. The movement of corner cube 1722 is shown by double-headed arrow 1772 and ghost lines 1774. Although only a single data page1752 is illustrated as being recovered in FIG. 16, the holographic storage device or system of FIG. 17 may be used to recover all of the data pages stored in recording material 1736 of holographic storage medium 1718.

As in the device or system of FIG. 16, readout may be performed by the device or system of FIG. 17 with the reference (reconstruction) beam reflected (directed) by a mirror or reflective layer and corner cube 1762. But the pivot point of the reference (reconstruction) beam when changing the reference (reconstruction) beam angle for angular multiplexing is not always on the center of corner cube 1762. In this case, the angle of the reference (reconstruction) beam reflected (directed) by corner cube 1762 does not change but its position does move with the change of reference beam angle. In order to avoid such movement of the reference (reconstruction) beam, the position of corner cube 1762 may be controlled (as illustrated by movement to the position illustrated by ghost lines 1774) so that the reference (reconstruction) beam reflected (directed) by the mirror or reflective layer always illuminates the center of corner cube 1762.

Figure 18:
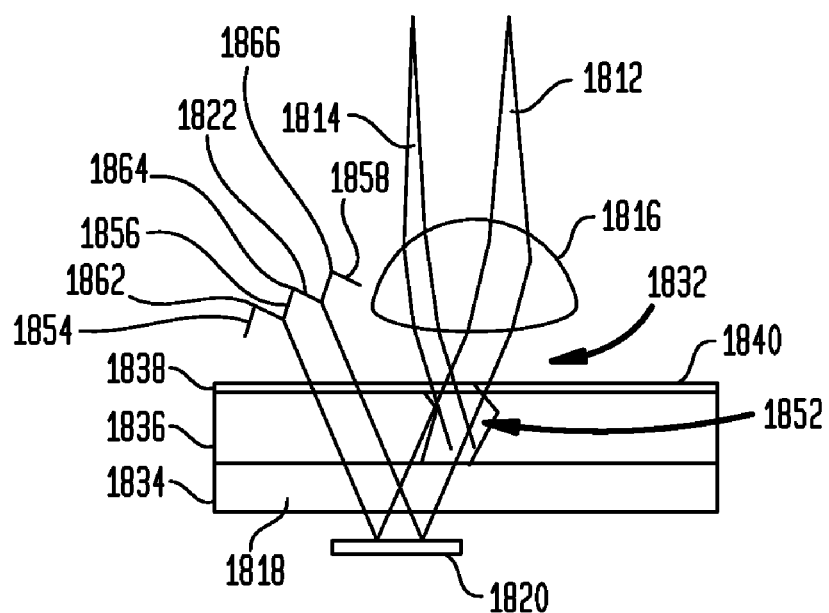
FIG. 18 is a schematic diagram illustrating data recovery by a monocular holographic storage device and system according to one embodiment of the present invention using a corner cube array in a phase conjugate geometry.

FIG. 18 shows a monocular holographic storage device or system 1802 according to one embodiment of the present invention using a corner cube array in a phase conjugate geometry illustrating data recovery (but where device or system 1802 may also be used to store the data that is recovered). Holographic storage device or system 1802 includes a reference beam 1812 (also referred to as a reconstruction beam when used for data recovery), a representative portion of recovered beam 1814, an objective lens 1816, a holographic storage medium 1818, a reflective layer 1820 and a corner cube array 1822. There is an air gap 1832 between objective lens 1816 and holographic storage medium 1818. Holographic storage medium 1818 includes a lower substrate 1834, a recording material 1836, an upper substrate 1838 and an upper surface 1840. Holographic storage device or system 1802 allows a data page 1852 stored in recording material 1836 to be recovered (read) as recovered beam 1814. For example, corner cube array 1822 may include three corner cubes 1854, 1856 and 1858, each having a respective center 1862, 1864 and 1866. Although only a single data page 1852 is illustrated being recovered in FIG. 18, holographic storage device or system 1802 of FIG. 18 may be used to recover all of the data pages stored in recording material 1836 of holographic storage medium 1818. Additional smaller corner cubes may also be used in arrays such as 1822 illustrated in FIG. 18. A corner cube array such as 1822 with a plurality of smaller corner cubes reduces the size of the corner cube system versus one large corner cube.

As in the device or system of FIG. 17, readout is performed in the device or system of FIG. 18 with the reference (reconstruction) beam reflected (directed) by a mirror or reflective layer and corner cube array 1822. Again, the pivot point of the reference (reconstruction) beam in changing the reference (reconstruction) beam angle for angular multiplexing is not always on the center of corner cube array 1822. The amount of beam shift due to reflection (direction) of the reference (reconstruction) beam by the corner cube is also proportional to the size of corner cube. Because corner cube array 1822 comprises a plurality of smaller cube arrays (e.g., 1854, 1856 and 1858), each of which may be smaller than the reconstructed beam size, it may be possible to suppress this beam shift of reference (reconstruction) beam so that phase conjugation may be achieved. In addition, this beam shift may be suppressed by a micro corner cube array such 1822 without moving the array (as may be required with a larger corner cube such as 1762 illustrated in FIG. 17).

In the devices or systems of FIGS. 16, 17 and 18, optical components may also be placed on the same side of holographic storage medium as the objective lens. According to this layout or configuration of the optical components, it may be possible to downsize the height of holographic drive device because most of the optics and electronics may be on the same side of the holographic storage medium. Alternatively, the foregoing phase conjugation optical components may be placed on the opposite side of the medium. In this alternate configuration, there is no need to place a mirror or reflective layer on the back side of the medium, as illustrated in FIGS. 16, 17 and 18.

Figure 19:
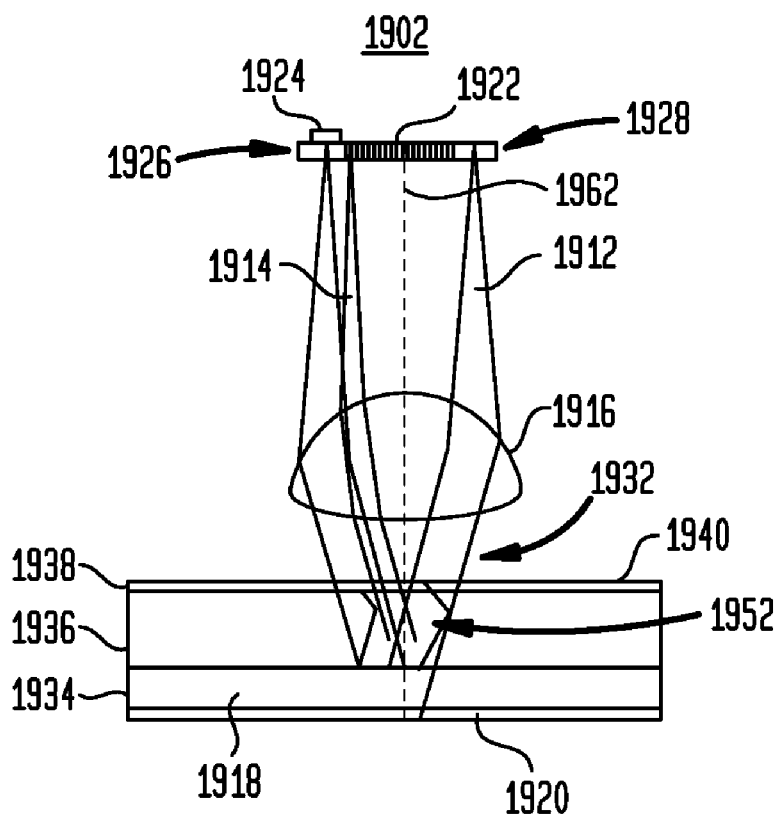
FIG. 19 is a schematic diagram illustrating data recovery by a monocular holographic storage device or system according to one embodiment of the present invention using another phase conjugate geometry.

FIG. 19 shows a monocular holographic storage device or system 1902 according to one embodiment of the present invention using another phase conjugate geometry illustrating data recovery (but where device or system 1902 may also be used to store the data that is recovered). Holographic storage device or system 1902 includes a reference beam 1912 (also referred to as a reconstruction beam when used for data recovery), a representative portion of recovered beam 1914, an objective lens 1916, a holographic storage medium 1918, a reflective layer 1920, an SLM 1922 and a mirror 1924. There is an air gap 1932 between objective lens 1916 and holographic storage medium 1918. Holographic storage medium 1918 includes a lower substrate 1934, a recording material 1936, an upper substrate 1938 and an upper surface 1940. Holographic storage device or system 1902 allows a data page 1952 stored in recording material 1936 to be recovered (read) as recovered beam 1914. Reflective layer 1920 is mounted on lower substrate 1934. Mirror 1924 is mounted on SLM 1922 above transparent space 1926, with SLM 1922 having another transparent space to allow reference (reconstruction) beam 1912 to pass through. Objective lens 1916 has an optical axis 1962. Although only a single data page 1952 is illustrated as being recovered in FIG. 19, holographic storage device or system 1902 of FIG. 19 may be used to recover all of the data pages stored in recording material 1936 of holographic storage medium 1918. Other layers may also be included in holographic storage medium 1918, including absorption layers, polarization layers or variable beam transmission layers that may limit recording of holograms to the transmission of holograms during record and eliminate or reduce the effect of reflections from reflective layer 1920. Reflective layer 1920 also only needs to be behind recording layer 1936.

Figure 20:
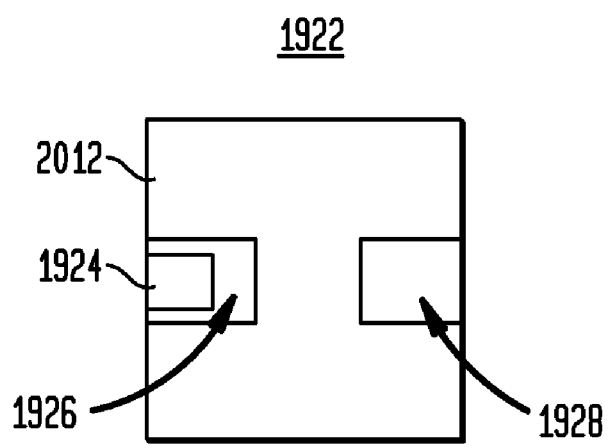
FIG. 20 is a top plan view of the spatial light modulator (SLM) used in the device or system of FIG. 19.

FIG. 20 is top plan view of SLM 1922 represented in FIG. 19 that may be used in device or system 1902. SLM 1902 includes data pixel portion 2012 represented as a generally H-shaped area. Transparent space 1928 used to introduce the reference (reconstruction) beam 1912 is represented on one side of SLM 1922 as a rectangular-shaped area. Mirror 1924 is represented as a smaller filled (black) rectangular-shaped area which is above and adjacent transparent space 1926 represented on the opposite side of SLM 1922 as a rectangular-shaped area.

During data recovery with device or system 1902 of FIG. 19, reference (reconstruction) beam 1912 is focused on the same plane as SLM 1922 through transparent space 1928 provided in SLM 1922. After passing through transparent space 1928, reference (reconstruction) beam 1912 passes through objective lens 1916, is angled (incident) onto holographic storage medium 1918 and then passes through objective lens 1916 again after reflection (direction) by reflective layer 1920 on the back side of medium 1918. Reflected (directed) reference (reconstruction) beam 1912 is focused back by objective lens 1916 onto the same plane as SLM 1922 as shown in FIG. 19 towards transparent space 1926. Mirror 1924 is placed over transparent space 1926 at this focus plane. Reference (reconstruction) beam 1912 is then reflected (directed) back by mirror 1924 and travels along the same path but in the opposite direction. Readout of data page 1952 from recording material 1936 of holographic storage medium 1918 is performed with this reference (reconstruction) beam 1912 reflected (directed) from mirror 1924 and then from reflective layer 1920 as a phase conjugate wave to provide recovered beam 1914.

Figure 21:
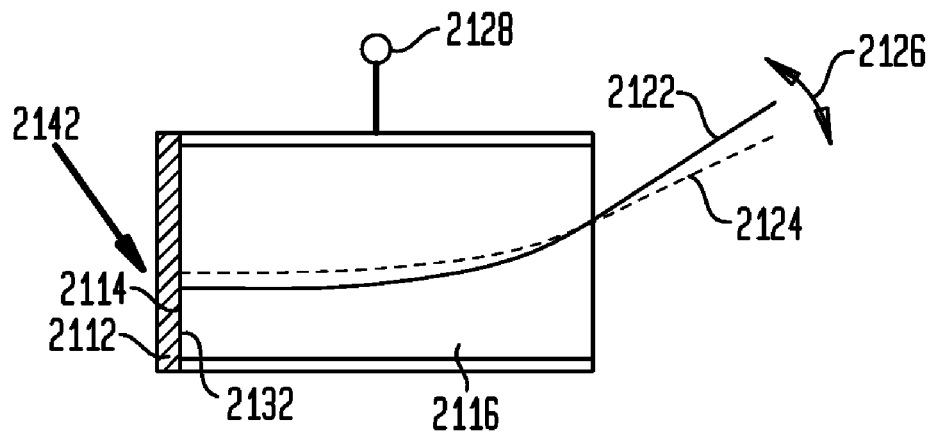
FIG. 21 is a schematic diagram of an electro-optic (EO) crystal device or system according to one embodiment of the present invention.

In another embodiment of the holographic storage device or system of the present invention, an electro-optic crystal (EO crystal) may be used as phase conjugate optical device or system. An optical beam traveling through an EO crystal is deflected (directed) by voltage application to the EO crystal because injected electrons induce gradation of the refractive index inside the EO crystal. By controlling the applied voltage to the EO crystal, even if the reference (reconstruction) beam angle changes during the recovery process, the incident angle of each reference (reconstruction) beam entering the EO crystal should always be perpendicular to a mirror mounted at one end of the EO crystal, as illustrated in FIG. 21 below. Use of an EO crystal is similar in concept as galvo mirror but using an EO crystal, or alternatively an acoustic optical (AO) cell, may provide more compact optical components than a galvo mirror.

FIG. 21 shows an EO crystal device or system 2102 useful in an embodiment of a holographic storage device or system of the present invention. EO crystal system 2102 includes a mirror 2112 placed on an end 2114 of an EO crystal 2116. Reference (reconstruction) beams 2122 and 2124 having different angles, indicated by double-headed arrows 2126, are shown entering EO crystal 2116. An external voltage source 2128 is applied to EO crystal 2116 so that reference (reconstruction) beams 2122 and 2124 are each perpendicular to surface 2132 of mirror 2112 when they are incident on surface 2132, as indicated by arrow 2142. Each reference (reconstruction) beam (i.e., either 2122 or 2124), after being reflected by mirror 2112, travels through the same path as it entered but in the opposite direction. That is to say, the EO crystal device or system 2102 acts as a phase conjugate optical system. Two reference (reconstruction) beams 2122 and 2124 are shown entering EO crystal device or system 2102 of FIG. 21 for illustration purposes. In operation, generally only one reference (reconstruction) beam enters EO crystal device or system 2102 at one time.

Figure 22:
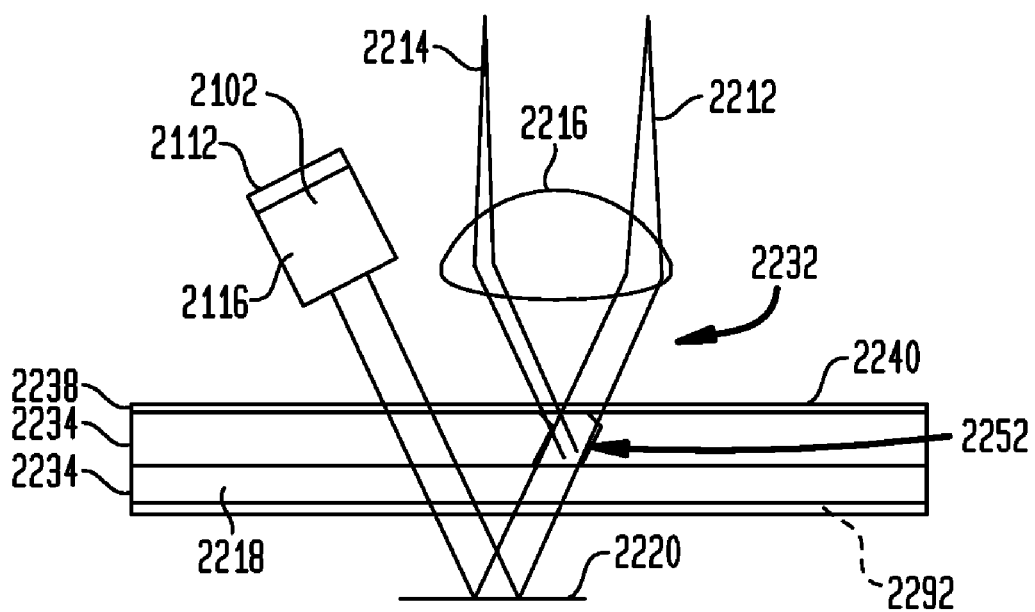
FIG. 22 is a schematic diagram illustrating data recovery by a monocular holographic storage device or system according to one embodiment of the present invention using the EO crystal device or system of FIG. 21.

FIG. 22 shows a monocular holographic storage device or system 2202 according to one embodiment of the present invention that includes EO crystal system 2102 of FIG. 21 illustrating data recovery (but where device or system 2202 may also be used to store the data that is recovered). Holographic storage device or system 2202 also includes a reference beam 2212 (also referred to as a reconstruction beam when used for data recovery), a representative portion of recovered beam 2214, an objective lens 2216, a holographic storage medium 2218, and a reflective layer 2220. There is an air gap 2232 between objective lens 2216 and holographic storage medium 2218. Holographic storage medium 2218 includes a lower substrate 2234, a recording material 2236, an upper substrate 2238 and an upper surface 2240. Holographic storage device or system 2202 allows a data page 2252 stored in recording material 2236 to be recovered (read) as recovered beam 2214. Dashed arrow 2292 illustrates an alternative location for reflective layer 2220 where reflective layer 2220 is mounted on holographic storage medium 2218. Although only a single data page 1652 is illustrated as being recovered in FIG. 22, the holographic storage device or system 2202 of FIG. 22 may be used to recover all of the data pages stored in recording material 2236 of holographic storage medium 2218.

In FIG. 22, the phase conjugate EO crystal device or system 2102 is set up on the same side of holographic storage medium 2218 as the other optical components (e.g., objective lens 2216). Using this layout or configuration, it is possible to downsize the height of the holographic drive device because almost all optics and electronics may be on the same side of medium 2218. Alternatively, the phase conjugate optical EO crystal device or system 2102 may be located on the opposite side of holographic storage medium 2218 as objective lens 2216. In this case, no reflective layer 2220 is needed on the back of medium 2218 in order to fold the reference (reconstruction) beam path back towards medium 2218.

Figure 23:
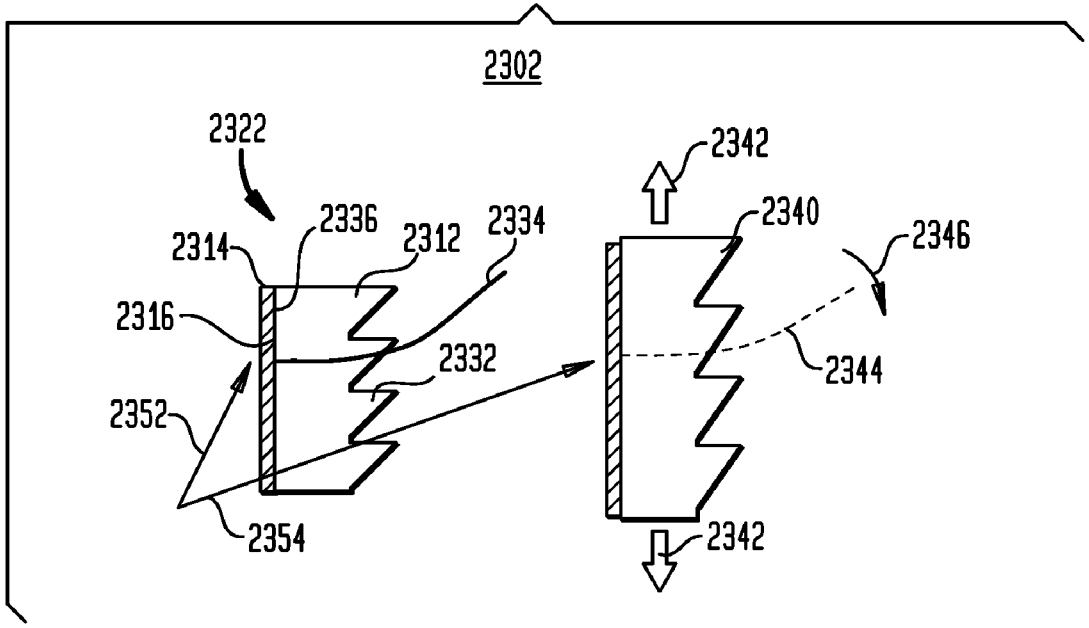
FIG. 23 is a schematic diagram of a diffraction device or system according to one embodiment of the present invention.

A diffraction angle of the light by the grating is determined by its wavelength and period of the grating. Therefore, in one embodiment of the holographic storage device or system of the present invention, a diffraction element, such as blazed grating, may be used as a phase conjugate optical device or system. FIG. 23 shows a diffraction device or system 2302 according to one embodiment of the present invention. Diffraction device or system 2302 includes a tunable blazed grating 2312 and a mirror 2314 mounted on a side 2316 of blazed gating 2312. Diffraction device or system 2302 is shown in two states 2322 and 2324. In state 2322, blazed grating 2312 has a first period (illustrated schematically as sawtooth shape 2332) that causes a reference (reconstruction) beam 2334 to be perpendicular to surface 2336 of mirror 2314. In state 2324, blazed grating 2312 has a second period (illustrated by as sawtooth shape and arrows 2342) that causes reference (reconstruction) beam 2344 to be perpendicular to mirror surface 2336 of mirror 2314. Arrow 2346 illustrates the change in angle between reference (reconstruction) beam 2334 and reference (reconstruction) beam 2344. Arrows 2352 and 2354 illustrate how reference (reconstruction) beams 2334 and 2344, which have different angles when they enter blazed grating 2312, are both made perpendicular to mirror surface 2336 by blazed grating 2312.

In one embodiment, blazed grating 2312 may be liquid crystal elements. The arrangement of the molecules in the liquid crystal may be controlled by voltage application. As a result, the period of the grating may be changed. The period of the grating may be controlled in order that the incident reference (reconstruction) beam will always be retro-reflected, even if the reference (reconstruction) beam angle changes during the data recovery process. Then the reference (reconstruction) beam, after being reflected (directed) by the mirror 2314, travels along the same path but in the opposite direction. That is to say, the diffraction system 2302 of FIG. 23 acts as a phase conjugate optical device or system.

Figure 24:
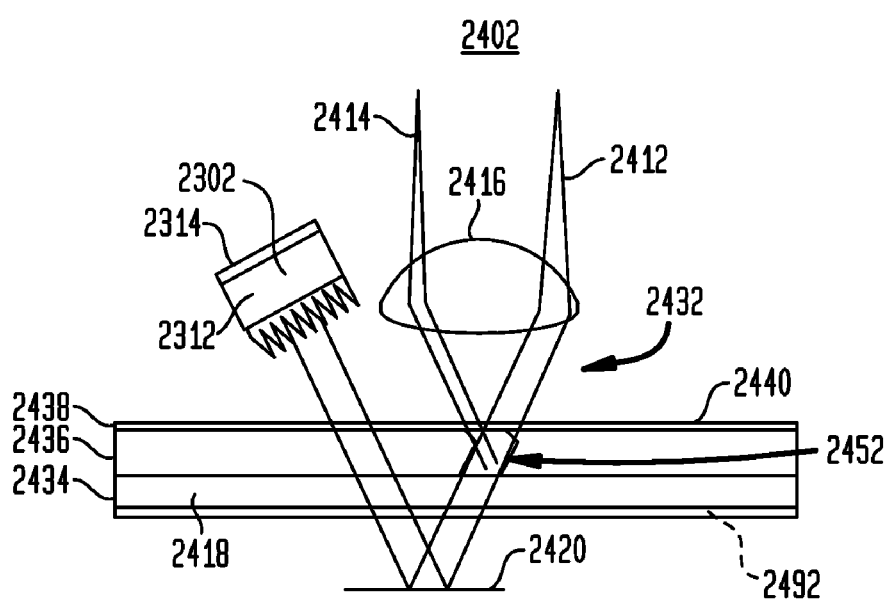
FIG. 24 is a schematic diagram illustrating data recovery by a monocular holographic storage device or system according to one embodiment of the present invention using the diffraction device or system of FIG. 23.

FIG. 24 shows a monocular holographic storage device or system 2402 according to one embodiment of the present invention where device or system 2402 includes diffraction device or system 2302 of FIG. 23 illustrating data recovery (but where device or system 2402 may also be used to store the data that is recovered). Holographic storage device or system 2402 also includes a reference beam 2412 (also referred to as a reconstruction beam where used for data recovery), a representative portion of recovered beam 2414, an objective lens 2416, a holographic storage medium 2418 and a reflective layer 2420. There is an air gap 2432 between objective lens 2416 and holographic storage medium 2418. Holographic storage medium 2418 includes a lower substrate 2434, a recording material 2436, an upper substrate 2438 and an upper surface 2440. Holographic storage device or system 2402 allows a data page 2452 stored in recording material 2436 to be recovered (read) as recovered beam 2414. Dashed arrow 2492 illustrates an alternative location for reflective layer 2420 where reflective layer 2420 is mounted on holographic storage medium 2418. Although only a single data page 2452 is illustrated s being recovered in FIG. 24, holographic storage device or system 2402 of FIG. 24 may be used to recover all of the data pages stored in recording material 2436 of holographic storage medium 2418.

In FIG. 24, the diffraction device or system 2302 is set up on the same side of holographic storage medium 2418 as the other optical components (e.g., objective lens 2416). Using this layout or configuration, it is possible to downsize height of holographic drive device because almost all optics and electronics may be on the same side of holographic storage medium 2418. Alternatively, the diffraction device or system 2302 may be located on the opposite side of medium 2418 as objective lens 2416. In this case, no reflective layer 2420 is needed on the back of medium 2418 in order to fold the reference (reconstruction) beam path back towards medium 2418. The tunable grating may also be in holographic storage medium 2418.

Figure 25:
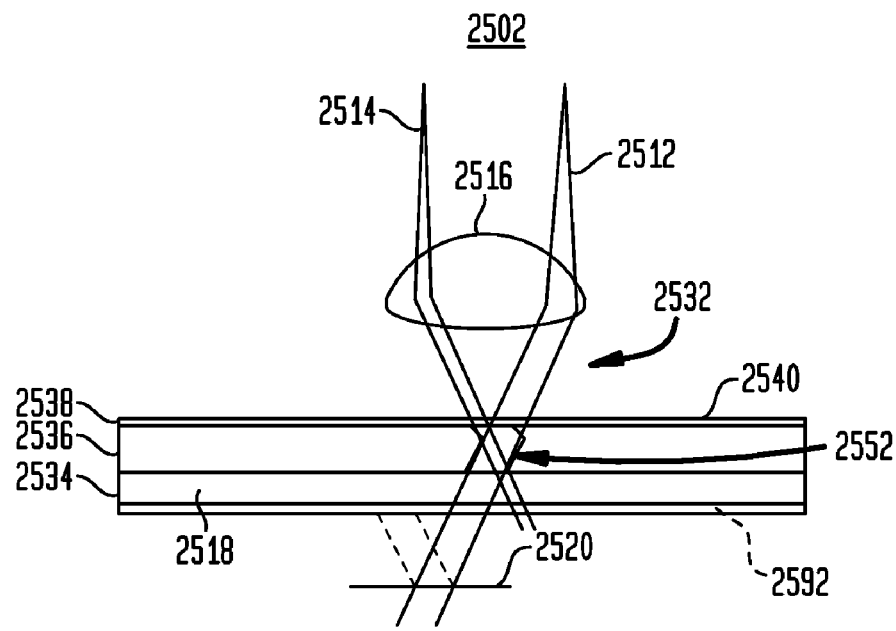
FIG. 25 is a schematic diagram illustrating data storage by a monocular holographic storage device or system according to one embodiment of the present invention.
Figure 26:
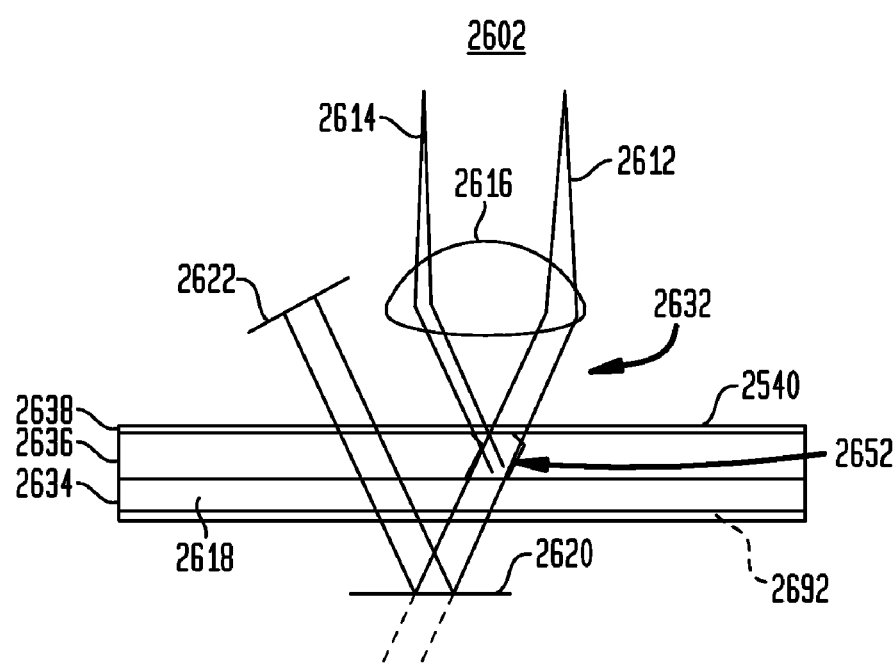
FIG. 26 is a schematic diagram of the same or similar device or system of FIG. 25 but illustrating data recovery.

It may be desirable in some embodiments of the present invention that the reflectance of the reflective layer during data information recording be as low as possible. Suppression of reflection of the reference beam may be desirable during data storage because the reference beam reflected by the reflective layer travels through holographic storage medium again, which leads to a "waste hologram" in the medium. This "waste hologram" that may be formed by this reflection may also cause media dynamic range loss. On the other hand, it is desirable that the reflectance of the reflective layer during recovery of data from a holographic storage medium be high enough to achieve phase conjugate readout effectively. FIG. 25 shows the effectiveness of keeping the reflectance of the reflective layer low during data storage and FIG. 26 shows the effectiveness of making the reflectance of the reflective layer high during data recovery. The holographic storage devices or systems of FIGS. 25 and 26 may be viewed as a single holographic storage device or system for data storage and recovery because they share many of the same features, including the same variable reflective layer.

FIG. 25 shows a monocular holographic data storage device or system 2502 according to one embodiment of the present invention illustrating data storage. Holographic data storage device or system 2502 includes a reference beam 2512, a representative portion of a data beam 2514, an objective lens 2516, a holographic storage medium 2518 and a reflective layer 2520. There is an air gap 2532 between objective lens 2516 and holographic storage medium 2518. Holographic storage medium 2518 includes a lower substrate 2534, a recording material 2536, an upper substrate 2538 and an upper surface 2540. Holographic data storage device or system 2502 is shown storing a data page 2552 in recording material 2536 where reference beam 2512 and data beam 2514 overlap and interfere. During data storage, reflective layer 2520 has a low reflectance to thus allow reference beam 2512 to pass through reflective layer 2520. Dashed arrow 2592 illustrates an alternative location for reflective layer 2520 where reflective layer 2520 is mounted on holographic storage medium 2518

FIG. 26 shows a monocular holographic storage device or system 2602 according to one embodiment of the present invention that is same or similar to that of FIG. 25 but illustrating data recovery. Holographic storage device or system 2602 includes a reference beam 2612 (also referred to as a reconstruction beam when used for data recovery), a representative portion of recovered beam 2614, objective lens 2616, holographic storage medium 2618, reflective layer 2620 and a phase conjugate optical system 2622. Holographic storage device or system 2602 allows data pages 2652 stored in recording material 2636 to be recovered (read) as recovered beam 2614. During data recovery, reflective layer 2620 has been modified, altered, changed, etc., to be of higher reflectance to thereby cause reference beam 2612 to be reflected (directed) toward phase conjugate optical system 2622. Phase conjugate optical system 2622 reflects (directs) reference (reconstruction) beam 2612 back along the path of reference (reconstruction) beam 2612 in the opposite direction. Although only a single data page 2652 is illustrated as being recovered in FIG. 26, holographic storage device or system 2602 of FIG. 26 may be used to recover all of the data pages stored in recording material 2636 of holographic storage medium 2518. Dashed arrow 2592 illustrates an alternative location for reflective layer 2520 where reflective layer 2520 is mounted on holographic storage medium 2218

Phase conjugate optical system 2622 used in holographic storage device or system 2602 of FIG. 26 may be any suitable phase conjugate optical system, including the phase conjugate optical systems described above, for example, in FIGS. 15-24. To control the reflectance of reflective layer 2620, an electrochromic or photochromic medium may be used as reflective layer 2620 and the reflectance of reflective layer 2620 may be controlled by external factors such as voltage application or exposure to light.

In one variation of the holographic storage device or system of FIGS. 25 and 26, a polarizing beam splitter (PBS) layer may be used as the reflective layer. When the polarization state of the reference beam is switched to a p-polarization state during the record (write) process, the reference beam almost goes through the reflective layer and is hardly reflected. When the polarization state of the reference (reconstruction) beam is switched to an s-polarization state during the read (recovery) process, the reference (reconstruction) beam may be almost reflected by the PBS layer and it is thus possible to achieve phase conjugate readout effectively.

In all the embodiments above that employ a reflective layer, the reflective layer may be part of the holographic storage medium (as shown, for example, in FIG. 19) or separate from the medium (as shown, for example, in FIGS. 25 and 26). The reflective layer in all cases, whether part of the holographic storage medium or separate from the medium, may be a static reflective layer or a variable beam reflective layer which may be a reflective (during data recovery) or transmissive (during data storage), as discussed above.

Figure 27:
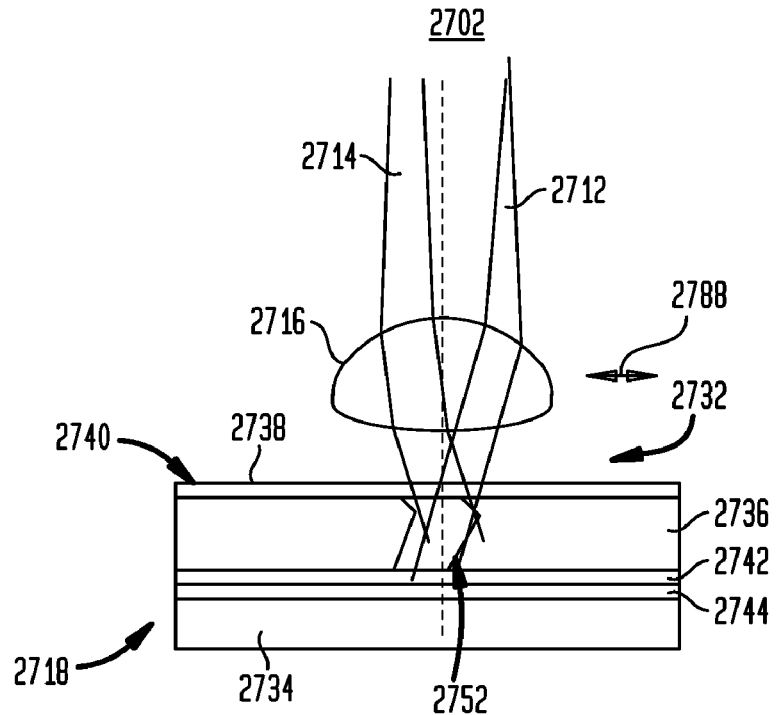
FIG. 27 is a schematic diagram illustrating data storage by a monocular holographic storage device or system according to one embodiment of the present invention.
Figure 28:
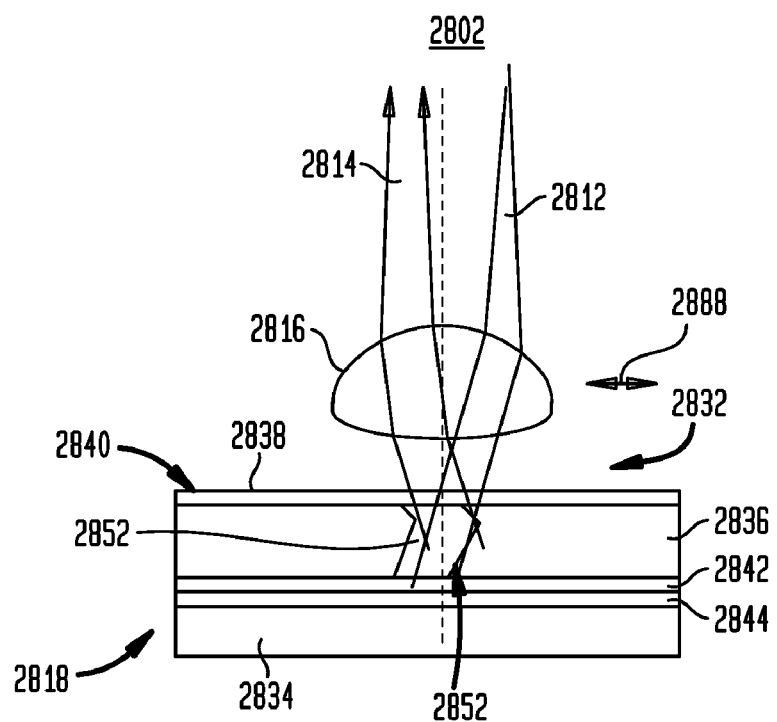
FIG. 28 is a schematic diagram of the same or similar device or system of FIG. 27, but illustrating data recovery.

Another embodiment of a holographic data storage device or system is shown in FIGS. 27 and 28. FIG. 27 shows a monocular holographic storage device or system 2702 according to one embodiment of the present invention illustrating data storage. Holographic storage device or system 2702 includes a reference beam 2712, a representative portion of a data beam 2714, an objective lens 2716 and a holographic storage medium 2718. There is an air gap 2732 between objective lens 2716 and holographic storage medium 2718. Holographic storage medium 2718 includes a lower substrate 2734, a recording material 2736, an upper substrate 2738 positioned over the recording material 2736, an upper surface 2740, a variable beam transmission layer 2742 positioned underneath recording material 2736, and a grating layer 2744 positioned underneath variable layer 2740 with the lower substrate 2734 being positioned underneath grating layer 2744. Upper substrate 2740 may be much thinner than lower substrate 2734. For example lower substrate 2734 maybe about 1 mm in thickness while upper substrate 2740 maybe in the range of from about 100 to about 500 microns in thickness. Holographic storage device or system 2702 is shown storing a data page 2752 in recording material 2736 where reference beam 2712 and data beam 2714 overlap and interfere. During data storage, variable layer 2742 partially or completely absorbs reference beam 2712 and/or data beam 2714. Variable layer 2742 and grating layer 2744 may also become transparent during recording (data recovery). Double headed arrow 2788 shows how objective lens 2716 may be moved. Objective lens 2716 has an optical axis 2790. Device or system 2702 may also be multiplexed by moving objective lens 2716, the reference beam lens (not shown), or changing the angle of incidence of the reference beam into the reference beam lens by rotating or translating the reference beam using a mirror.

FIG. 28 shows a monocular holographic storage device or system 2802 according to one embodiment of the present invention that is same or similar to that of FIG. 27 but illustrating data recovery. Holographic storage device or system 2802 includes a reference beam 2812 (also referred to as a reconstruction beam when used for data recovery), a representative portion of recovered beam 2814, objective lens 2816, and a holographic storage medium 2818. Holographic storage medium 2818 includes a lower substrate 2634, a recording material 2836, an upper substrate 2838 positioned over the recording material 2836, an upper surface 2840, a variable beam transmission layer 2842 positioned underneath recording material 2836, and a grating layer 2844 positioned underneath variable layer 2840 with the lower substrate 2834 being positioned underneath grating layer 2844. Upper substrate 2840 may be much thinner than lower substrate 2834. For example lower substrate 2834 maybe about 1 mm in thickness while upper substrate 2840 maybe in the range of from about 100 to about 500 microns in thickness. Holographic storage device or system 2802 allows a data page 2852 stored in recording material 2836 to be recovered (read) as recovered beam 2814. During data recovery, variable layer 2842 has been modified, altered, etc., to allow reference (reconstruction) beam 2812 to pass through variable layer 2842 and be reflected (directed) by grating layer 2844 back along the original path of reference (reconstruction) beam 2812 in the opposite direction. Objective lens 2816 has an optical axis 2890. Although only a single data page 2852 is illustrated as being recovered in FIG. 28, holographic device or system 2802 of FIG. 28 may be used to recover all of the data pages stored in recording material 2836 of holographic storage medium 2818.

During data storage according to the devices or systems of FIGS. 27 and 28, the variable beam transmission layer may be controlled to absorb the light from the reference beam. During data recovery, the reference (reconstruction) beam is introduced into the holographic storage medium and the variable layer allows the reference (reconstruction) beam, e.g. the variable layer may be made transparent. The reference (reconstruction) beam then hits the grating layer, e.g., a thin diffractive grating that is fabricated into the holographic storage medium. This grating for a given angle retro-reflects the reference (reconstruction) beam, thus creating a phase conjugate of the reference (reconstruction) beam for recovering a data page from the holographic storage medium that is eventually detected by a detector (e.g., camera). Phase change media is an example of what may be used for the variable beam transmission layer. Any electrochromic or photochromic material may be used as a phase change media for the variable layer, including using the polarization techniques described above to change the beam transmissive characteristics of the variable layer and/or the grating layer (or a reflective layer like reflective layer 1920 shown in FIG. 19) in response thereto. For example, during writing (recording) of data, one polarization of the reference beam may be used which is absorbed by the variable layer or which has lower reflectivity off of the grating layer (or the reflective layer), with data being readout (recovered) using a different polarization of the reference (reconstruction) beam which is more transmissive to the variable layer or has higher reflectivity from the grating layer (or the reflective layer). The variable layer and/or the grating layer (or the reflective layer) may also use polymerization of or other chemical changes in one or more components present therein to change the index or transmission characteristics of the variable layer, or the reflection characteristics of the grating layer (or the reflective layer).

In the holographic storage devices or systems of FIGS. 27 and 28, the data beam and reference beam are introduced through the same objective lens and holograms are multiplexed into the holographic storage medium by dithering the objective lens or changing the reference beam angle, as described above. The signal beam is modulated with data, for example, using a spatial light modulator (SLM) (not shown in FIGS. 27 and 28) that modulates either amplitude or phase or both to encode the data, thus creating the data beam. The reference beam is formed into a quasi plane wave by the objective lens and interfered with the data beam in the holographic storage medium to record that particular page of data (hologram) by angle multiplexing. In the holographic storage medium the variable layer preferably absorbs the light during recording so that additional holograms are not recorded or stray light does not waste the materials recording ability (M#). In some embodiments, it may be possible to omit the variable layer, but with some loss in achievable capacity. Alternatively, the grating and variable layer may be made transparent during recording.

The grating in the grating layer of the holographic storage medium used in the holographic storage devices or systems of FIGS. 27 and 28 is designed to retro-reflect the center angle of the sweep of angles used by the reference (reconstruction) beam. The grating is hidden by the variable beam transmission layer during recording (data storage). The grating may be formed in the substrate (e.g., lower substrate), for example, a stampable feature formed into the substrate of the holographic storage medium. The grating may be a diffractive structure that varies around a disk-shaped holographic storage medium so that the grating is aligned correctly for the optical head of a holographic drive device as the disk-shaped holographic storage medium comes underneath it. Such a grating design may be simpler and lower in cost to manufacture. The index contrast should still be large enough with the covering layer (which may be the variable layer) so the high diffraction efficiency is maintained. The grating may also be recorded in a thin polymer layer. The grating may be a holographic grating or gratings, or a surface relief grating with metallization. The grating may also be blazed grating, such as described above, to minimize diffraction orders. The grating may be continuous on the holographic storage medium or fabricated for a particular area roughly corresponding to book locations, for example, piece-wise gratings about book size around disk which change angle discretely for each book location.

For a fixed grating, there is only one angle that retro-reflects. But if the center angle of the multiplexed holograms is, for example, 35 degrees, holograms recorded at 30, 31, 32, 33, 34, 35, 36, 37, 38, 39, and 40 degrees would be off normal. For example, the grating may have been fabricated to retro-reflect at 35 degrees. Then, to read the holograms that are recorded at 34 degrees, one may change the reference (reconstruction) beam (i.e., move the lens) so that the incident angle is 36 degrees. This would cause the reflection off the grating to be at 34 degrees, thus causing the hologram recorded at 34 degrees to be read. Thus, by changing the reference (reconstruction) beam incident angle, all recorded holograms may be read. The retro-reflection angle does change with wavelength but the likely wavelength changes for temperature compensation is relatively small so just a relatively small increase in angle scan range may accommodate such wavelength/temperature change effects.

Multiple gratings may be used for wide sweep ranges if the thickness of the grating is limiting the scan range. In addition, variable gratings may be used so that they are always retro-reflected, as described above. Blazed gratings may be used as well. The grating may be divided up into small linear sections to make up the entire disk-shaped holographic storage medium. This may provide a better wave-front quality for each book of data pages. These sections may also relate to the position of the books. The advantage of this method is to use a fixed grating which is much simpler and cheaper. In addition, it may be possible to have a grating that, by using voltage or light, may be hidden so the grating does not reflect. This would allow for the removal of the variable layer or incorporating the variable layer into the grating. See U.S. Published Application No. 2007/0127100 (Wilson e al.), published Jun. 7, 2007, the entire contents and disclosure of which is hereby incorporated by reference, for a more detailed description of methods for storing and positioning stacks of books.

The grating is shown in the devices and systems described above as being close to the recording material layer which is desirable as some displacement is possible. Even with displacement, the grating may be on the substrate or other places in the holographic storage medium that are on the far side of the recording material layer (i.e., away from the optics). It is possible that the grating may even be in the holographic drive device, rather than the holographic storage medium. If the medium is a disk, the grating direction may change as it goes around a radius of the disk so that the angle of retro-reflection may be aligned to the optical head. It may be aligned so that the multiplexing direction is either a disk radial direction (i.e., a direction along a radius of the disk) or disk theta direction (i.e., in a direction around the disk). The grating may be replaced by an array of slanted mirrors where the individual mirrors are the size of a stack (book) of angle multiplexed holograms or smaller. The grating may also be chirped (i.e., by a change in frequency of the period) to minimize higher order diffraction. The mirror may also be slanted to cause the same retro-reflection as in the grating described above.

Figure 29:
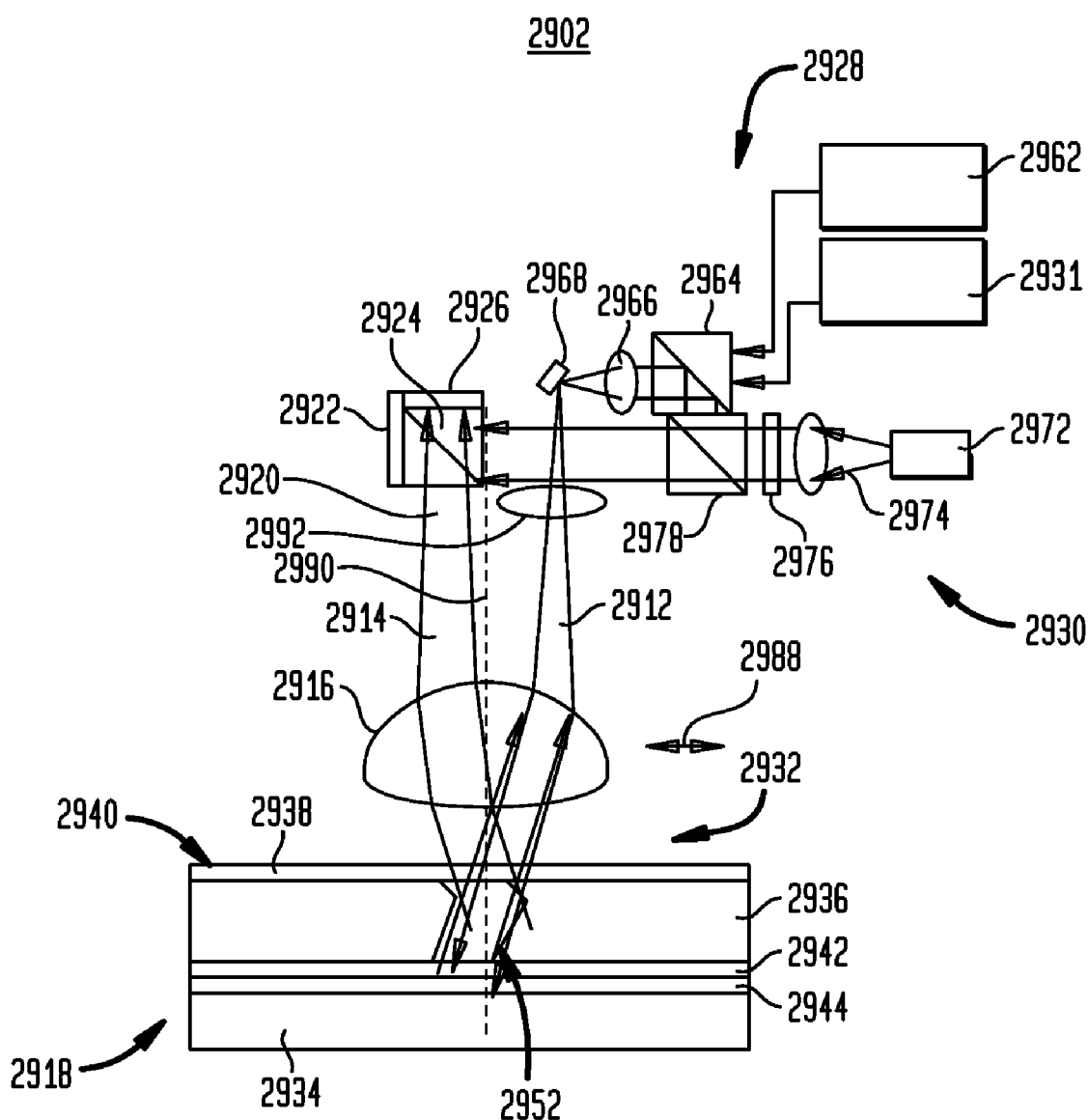
FIG. 29 is a schematic diagram of a monocular holographic storage device or system according to one embodiment of the present invention illustrating both data storage and data recovery.

FIG. 29 shows a monocular holographic storage device or system 2902 according to one embodiment of the present invention which may be used for data storage or data recovery. Holographic storage device or system 2902 includes a reference beam 2912 (also referred to as a reconstruction beam when used for data recovery), a data beam 2914, an objective lens 2916 and a holographic storage medium 2918, a thin film polytopic filter+ polarizing film 2920 (which may be on a PBS, detector array or SLM, or incorporated into objective lens 2916), an SLM 2922, a PBS 2924, a detector array 2926, a reference (reconstruction) beam generating system 2928, a data beam generating system 2930, and a cure/erase system 2931. There is an air gap 2932 between objective lens 2916 and holographic storage medium 2918. Holographic storage medium 2918 includes a lower substrate 2934, a recording material 2936, an upper substrate 2938, an upper surface 2940, a variable layer 2942 and a grating 2944. Holographic storage device or system 2902 is shown storing a data page 2952 in recording material 2936 where reference beam 2912 and data beam 2914 overlap and interfere. During data storage, variable layer 2942 partially or completely absorbs reference beam 2912 and/or data beam 2914. During data recovery, variable layer 2920 may be modified, altered, changed, etc., to allow reference (reconstruction) beam 2912 to pass through variable layer 2920 and be reflected (directed) by grating 2944 back along the original path of reference (reconstruction) beam 2912 in the opposite direction. Reference (reconstruction) beam generating system 2928 includes a reference (reconstruction) beam source 2962, a PBS (or mirror) 2964, a reference (reconstruction) beam lens 2966 and a mirror 2968 positioned between reference (reconstruction) beam lens 2966 and objective lens 2916 in the path of reference (reconstruction) beam 2912. Data beam generating 2930 system includes a data beam source 2972, a collimator 2974, a variable retarder 2976 and a PBS 2978. Double headed arrow 2988 shows how objective lens 2916 may be moved for the purpose of dithering reference (reconstruction) beam 2912 and data beam 2914. Objective lens 2916 has an optical axis 2990. As also shown in FIG. 29, reference (reconstruction) beam lens 2966 may alternatively be positioned where indicated by dashed oval 2992, with mirror 2968 being rotated or pivoted to change at what point reference (reconstruction) beam 2912 passes through reference (reconstruction) beam lens 2992 and objective lens 2916, and thus change the angle at which reference (reconstruction) beam 2912 is relayed from objective lens 2916 into holographic storage medium 2918.

In FIG. 29 a laser (not shown) is collimated and potentially has a shutter or is pulsed to record the information (data) onto holographic storage medium 2918. Reference (reconstruction) beam 2912 and data beam 2914 are created by PBS 2924. Variable retarder 2976 changes the amount of energy going into each of beams 2912 and 2914. For recording a suitable ratio of data beam 2914 intensity and reference beam 2912 intensity inside holographic storage medium 2918 may be close to about 1:1. Values may be in the range of from about 1:1 to about 1:10 with reference beam 2912 intensity typically kept higher than the average data beam 2914 intensity. For readout (data recovery), all of the energy may go into reference (reconstruction) beam 2912. A red laser servo system may be provided in the reference (reconstruction) beam path as shown or in the data beam path. The red laser would focus onto tracks on substrate(s) 2934/2940 and reflect back to the servo system to allow for focus and position information to be derived. This would be similar to what is done in a CD and DVD. A red laser may be used since it would not affect blue sensitive holographic storage medium. Another wavelength may be used but is desirably one that the holographic storage medium is not sensitive to. Track features may be at the edge of the recorded book in the medium. The track features may be much larger that normal CD marks since the positional and focus tolerances of the present invention may be much larger. Examples of holographic storage medium may include photopolymers such as InPhase's commercially available materials (e.g., InPhase Tapestry™ holographic media), or photochromatic or photorefractive materials. Suitable lasers and servo systems for use in the data storage and recovery devices or systems of the present invention may include those found in conventional CD and DVD players, etc.

A cure or erase system (such as system 2931 shown in FIG. 29) may be used to pre-cure, post-cure or erase holographic storage medium using illumination. This illumination is illustrated in FIG. 29 as being injected through the system but a separate cure/erase path may be provided to do larger areas at the same time, as described in U.S. Published Application No. 2006/0281021 (Riley et al.), published Dec. 14, 2006, the entire disclosure and contents of which is hereby incorporated by reference.

A detector array may be used to monitor power usage during write or cure (using, for example, leakage light).

The SLM and camera positions may be switched with the corresponding change in input polarization. For multiplexing the objective lens may be moved or the lens in the reference (reconstruction) beam path may be moved. The reference (reconstruction) beam mirror may also be used to achieve angle multiplexing by changing the tilt of the mirror, relative to the optical axis of the reference beam.

All holographic storage medium described herein may be in the shape of a disk, card, flexible tape media, etc. Recording and reading of books of holograms may be with the books arranged along circular tracks or lines in the medium. To help facilitate finding the holograms, servo marks may be put into the substrates of the medium to help identify the location on the disk. The medium structure and optics used may potentially be made so that a backward compatible device could be made. This means that the holographic drive device would read and write in other formats such as CD, DVD, HD-DVD, or Blu-ray Disc. Ideally, the objective lens used in the holographic drive device may also read CD, DVD, high-density optical disc formats (e.g. Blu-ray™ disks), etc. Other portions of the holographic drive device might be able to be shared for the conventional optical readout of standard optical media types. Allowing a single drive that reads and writes conventional optical disks and holographic optical disks recorded using the monocular architecture is advantageous to the customers.

The reflective layers in the embodiments described and shown above may be replaced by a mirror or other reflective device that reflects (directs) light in a similar manner to the reflective layers shown.

EXAMPLES

Example I

Figure 30:
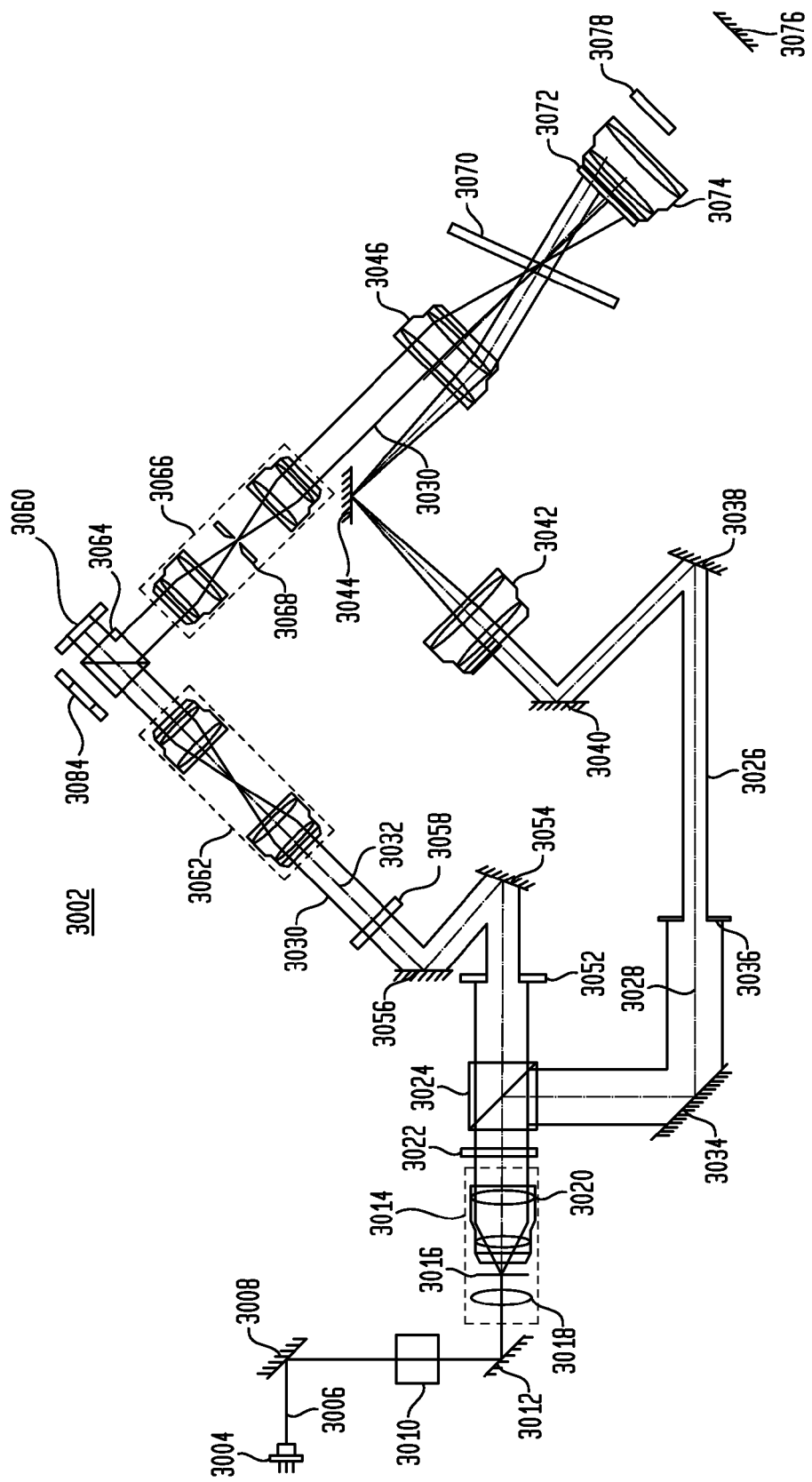
FIG. 30 is an architectural diagram of an embodiment of a monocular holographic storage device or system showing various components schematically according to one embodiment of the present invention in a record (write) configuration.

An embodiment of a monocular optical holographic data device or system 3002, which is shown schematically in FIG. 30 in a configuration for storing or recording (writing) holographic data. Device or system 3002 includes laser 3004 providing coherent light beam 3006 which is directed by mirror 3008 through a shutter 3010 to another mirror 3012. Mirror 3012 directs light beam 3006 to a main expander assembly 3014 which includes a pinhole 3016 and lens 3018 which spatially filter light beam 3006 and a lens assembly 3020 which expands and collimates filtered light beam 3006 to a fixed diameter. The expanded filtered light beam 3006 passes through a half wave plate (HWP) 3022, and enters a polarizing beam splitter (PBS) 3024. PBS 3024 splits light beam 3006 into a reference beam 3026 having a reference beam path 3028, and a data illumination beam 3030 having a data beam path 3032. Reference beam 3026 is directed by mirror 3034 though an iris 3036 to another mirror 3038. Mirror 3038 directs reference beam 3026 to another mirror 3040 which directs reference beam 3026 to reference beam lens 3042. Reference beam 3026 passes through reference beam lens 3042 and is directed by mirror 3044 to objective lens 3046.

Data illumination beam 3030 passes through a shutter 3052 and is directed by mirror 3054 to another mirror 3056. Mirror 3056 directs data illumination beam 3030 to a phase mask 3058 to improve the uniformity of the Fourier transform intensity distribution of the SLM. Data beam 3030 illumination of phase mask 3058 is then imaged onto SLM 3060 via 1:1 relay lens assembly 3062 and another PBS 3064. SLM 3060 modulates data beam 3030 to encode information into the data beam. SLM 3060 receives the encoding information for modulating data beam 3030 from drive electronics (not shown). Modulated data beam 3030 is reflected (directed) from SLM 3060, again passes through PBS 3064 which directs modulated data beam 3030 through another 1:1 relay lens assembly 3066 which includes polytopic filter 3068. Filtered data beam 3030 is then relayed from relay lens assembly 3066 to objective lens 3046.

Reference beam 3026 and data beam 3030 pass through objective lens 3046 and are angled into holographic storage medium 3070. Angled reference and data beams 3026 and 3030 overlap and interfere to form holographic data which is stored (recorded) in holographic storage medium 3070. Any residue of angled reference and data beams 3026 and 3030 which pass through medium 3070 reach beam block 3072 in front of phase conjugate optical assembly 3074. Beam block 3072 absorbs any of angled reference and data beams 3026 and 3030 which pass through holographic storage medium 3070.

Figure 31:
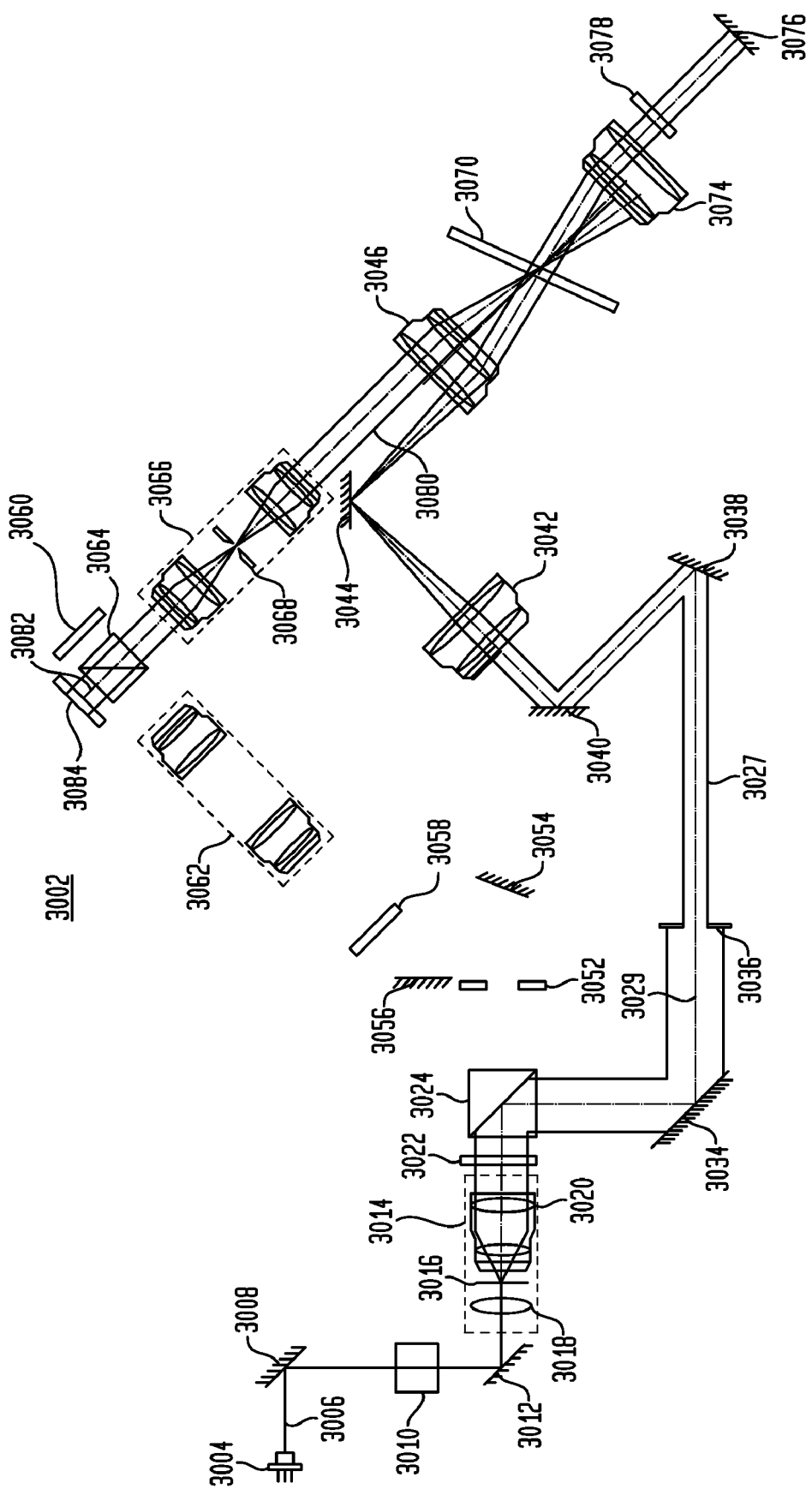
FIG. 31 is an architectural diagram of the device or system of 30, but in a read (recovery) configuration.

When system 3002 is in a read (holographic data recovery) configuration, as shown in FIG. 31, PBS 3024 collectively redirects coherent light beam 3006 into one discrete light beam 3027, which is referred to as a reconstruction beam. Reconstruction beam 3027 travels along the same path 3028 (now referred to as reconstruction beam path 3029) traveled by the original reference beam 3026 (of FIG. 30 during the write operation) to reach objective lens 3046. This reconstruction beam 3027 is angled by objective lens 3046 into holographic storage medium 3070 and passes through medium 3070 towards phase conjugate optical assembly 3074 and phase conjugate mirror 3076. During the read operation shown in FIG. 31, beam block 3072 is moved out of the way so that reconstruction beam 3027 may pass through phase conjugate optical assembly 3074 and then through quarter wave plate (QWP) 3078, which rotates the polarization of reconstruction beam 3027 by a quarter wave, and is reflected (directed) back by mirror 3076. The reflected (directed) reconstruction beam 3027 from mirror 3078 passes through quarter wave plate 3078 again, thus changing the polarization by another quarter wave so that when reconstruction beam 3027 (as recovered beam 3080) passes through PBS 3064, it is detected by camera 3084. After passing through quarter wave plate 3076, reconstruction beam 3027 passes again through phase conjugation optical assembly 3074 and again enters medium 3070.

After passing through phase conjugation optical assembly 3074 the second time, this reconstruction beam 3027 now enters medium 3070 as a phase conjugate of original reference beam 3026 (of FIG. 30) used to record (write) holographic data into medium 3070. This phase conjugate reconstruction beam 3027 counter-propagates along its original path and causes a phase conjugate (or a quasi phase conjugate) reconstruction of the hologram recorded in medium 3070 at that angle, i.e., reconstruction beam 3027 (as the phase conjugate of reference beam 3026) passes back through holographic storage medium 3070 at the same location that reconstruction beam 3027 initially passed through medium 3070, reconstructs the phase conjugate (or quasi-phase conjugate) of original data beam 3030 as it passes through medium 3070 again and forms a recovered beam 3080 by diffracting from a hologram of a stored data page in medium 3070. This recovered beam 3080 from medium 3070 then counter-propagates back along original data beam path 3032 (via 1:1 relay lens assembly 3066) and is directed by PBS 3064, as indicated by path 3082, towards camera 3084. The light from recovered beam 3089 is detected by camera 3084, converted to a signal and transmitted to drive electronics (not shown).

In device or system 3002, objective (storage) lenses 3046 used are Hasselblad lenses (F#2.0, focal length 110.8 mm) which allow ~1-2 degrees of sweep with 15 degrees between data beam 3030 and reference beam 3026. Lens 3046 is moved to change the angle. Experimental results are obtained using a 1280×1000 data page on SLM 3060 with a 12 μm pixel pitch while the recovered holograms are imaged using a 7 μm 2200×1726 pixel camera 3084. The detection uses an InPhase's over-sampled detection process. A phase mask 3058 is imaged onto SLM 3060 with relay lens assembly 3062 and is moved during multiplexing to mitigate any high frequency enhancement by changing the phase function. Phase mask 3058 allows for the Fourier Transform of the data page to be placed inside holographic storage medium 3070. Relay lens assembly 3066 (f=80 mm) images SLM 3060 to the back focal plane of objective lens 3046. In between the lenses of relay lens assembly 3066, a ~5 mm square polytopic filter 3068 is placed. Holographic storage medium 3070 is a standard 1.5 mm thick InPhase HDS-3000 transparent disk sensitive in green. The recording layer of medium 3070 is 1.5 mm thick. Laser 3004 used is a Coherent laser with 100 mW of power at 532 nm. A green, incoherent diode array is used to post-cure medium 3070 after holographic exposures are recorded. Medium 3070 (as a disk) may be rotated by a spindle motor and moved radially by a stepper motor to access different locations on the disk. Reference beam 3026 is introduced into objective lens 3046 by reference beam lens 3042 that allows reference beam 3026 to be a plane wave at medium 3070. To multiplex holograms (by changing the reference beam angle) either objective lens 3046 or reference beam lens 3042 may be translated. The size of the plane wave of reference beam 3026 at medium 3070 is approximately 5 mm. The center ray of data beam 3030 is approximately 27 degrees off medium 3070 normal and reference beam 3026 is approximately 8.5-19.5 degrees off of medium 3070 normal. Medium 3070 is tilted to eliminate direct reflection from medium 3070 and the lenses, but with improved coatings, normal incidence to medium 3070 for the central ray of the lens system may be possible.

In the experimental setup, phase conjugation is achieved by using a lens and a mirror as in phase conjugate optical assembly 3074 and mirror 3076, or by placing a grating after medium 3070. The grating used has 3600 line pairs per mm. This results in a huge angle required for retro reflection and a larger distance away from medium 3070. The distance from the photopolymer layer of medium 3070 may cause an undesired translation in the readout beam 3080. Ideally the grating may be designed for the wavelength used and the center angle of reconstruction beam 3027. This grating may be placed as close to the photopolymer layer in medium 3070 as possible to minimize the translation. Other holograms stored at reference beam angles that are not the center angle may also be readout. An example is when the center angle of the multiplexed holograms is 20 degrees and holograms are recorded at 18, 19, 20, 21, and 22 degrees off normal. The grating may be fabricated to retro-reflect at 20 degrees. To read the holograms that are recorded at 19 degrees, the angle of reconstruction beam 3027 is changed (e.g., by moving reflective beam lens 3042) so that the incident angle is 21 degrees. This may cause the reflection off the grating to be at 19 degrees, thus allowing the hologram recorded at 19 degrees to be readout. As long as the grating is thin (for example, a surface relief hologram), the momentum is conserved and the angle is changed. Thus by changing the reconstruction beam incident angle all of the holograms may be readout using this single fixed grating or the phase conjugate lens mirror pair.

Figure 32:
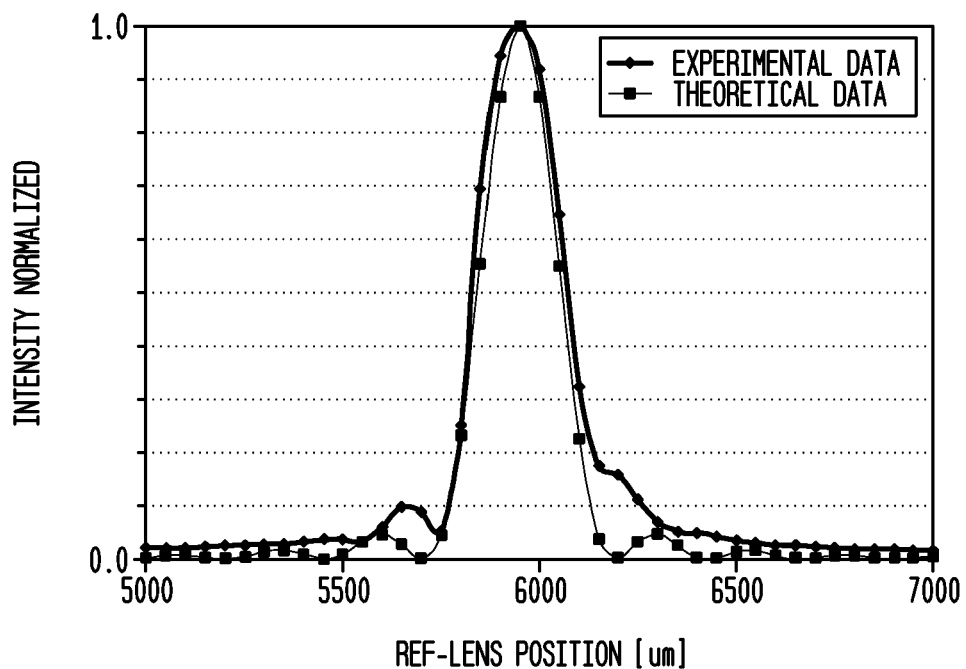
FIG. 32 shows a scan of the Bragg selectivity of the hologram compared to standard theoretical Bragg angular selectivity for the device or system of FIG. 30.

Experimental Results: FIG. 32 shows a scan of the Bragg selectivity of the hologram compared to standard theoretical Bragg angular selectivity for this geometry and wavelength. The relationship is given by the equation, $$\eta = \text{sinc}^2\left(\frac{\pi n L}{\lambda} \frac{\sin\theta_{RS}}{\cos\theta_S} \Delta\theta\right),$$

where $\eta$ is the diffraction efficiency, $\Delta\theta$ angle off of Bragg, L is the thickness of the recording layer, n is index of material, $\lambda$ is the wavelength of the laser, and the other $\theta$'s are the angles between reference and signal inside the media respectively. The agreement between experiment results and theory is very good.

Figure 33:
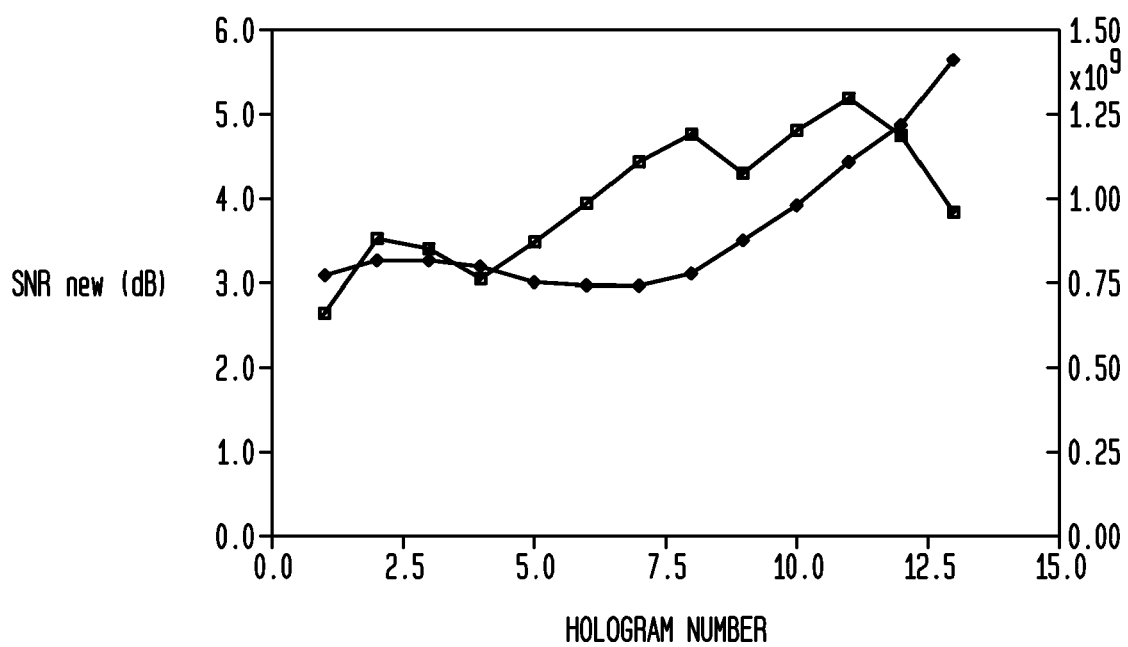
FIG. 33 shows a graph of signal to noise ratio (SNR) and relative intensity of 13 holograms multiplexed by moving the reference beam lens of the device or system of FIG. 30.
Figures 34, 35:
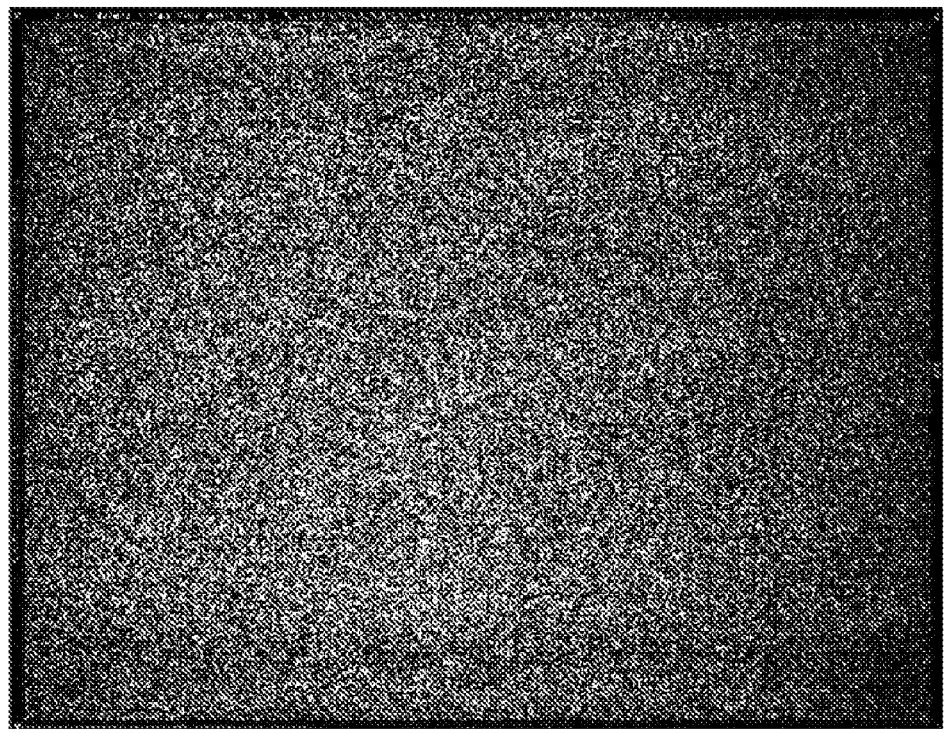
FIG. 34 shows an image of a recovered data page.
FIG. 35 shows an SNR map of the recovered data page of FIG. 34.

FIG. 33 shows a graph of signal to noise ratio (SNR) and relative intensity of 13 holograms multiplexed by moving reference beam lens 3042 (where SNR is 20 log_10(u1−u0/(s1+s2)), with u1 being the mean of ones and s1 being the sigma of ones (sigma squared is variance). The average SNR is 4 dB. This SNR is comparable to what is achieved by standard angle multiplexing using the same lenses, media and the filter. The experiments are also carried out by moving objective lens 3046 with similar results. These experiments are repeated with a grating in place of phase conjugate optical assembly 3074 and mirror 3076 with very similar results showing the basic feasibility of using a grating for off axis phase conjugation. FIG. 34 shows a reconstructed data page, while FIG. 35 shows an SNR map of this recovered data page. This hologram is readout using the grating and had an average SNR of 4.3 dB.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A holographic storage device or system comprising:
    a reference beam source for generating a reference beam;
    a data beam source for generating a data beam;
    a same objective lens through which the data beam and reference beam pass prior to the entering a holographic storage medium; and
    an objective lens mover for moving the same objective lens in a direction parallel to the upper surface of the holographic storage medium to thereby change an angle of the reference beam relative to the holographic storage medium,
    wherein the reference beam and data beam, after passing through the same objective lens, interfere to record one or more data pages in the holographic storage medium,
    wherein the data beam is angled at a first angle with respect to the optical axis of the objective lens when the data beam passes through the objective lens,
    wherein the reference beam is angled at a second angle with respect to the optical axis of the objective lens when the reference beam passes through the objective lens,
    wherein the first and second angles are different when at least some of the one or more data pages are recorded in the holographic storage medium, and
    wherein an angle of incidence of the reference beam on the holographic storage medium is changed by moving the same objective lens in the direction parallel to the upper surface of the holographic storage medium.

2. The holographic storage device or system of claim 1, wherein the reference beam source generates a reference beam in the form of a reconstruction beam for recovering the one or more data pages recorded in the holographic storage medium.

3. The holographic storage device or system of claim 1, wherein reference beam source and the data beam source comprises a polarizing beam splitter through which a collimated light beam passes to generate the reference beam and the data beam.

4. The holographic storage device or system of claim 3, which further comprises a polytopic filter on the polarizing beam splitter.

5. The holographic storage device or system of claim 1, further comprising a spatial light modulator positioned between a reference beam lens and the objective lens, wherein the spatial light modulator has a channel and wherein the reference beam passes through the channel after the reference beam lens.

6. The holographic storage device or system of claim 1, wherein the objective lens has a numerical aperture of at least about 0.65.

7. The holographic storage device or system of claim 6, wherein the objective lens has a numerical aperture of at least about 0.85.

8. The holographic storage device or system of claim 1, which further comprises a mirror positioned between a reference beam lens and the objective lens which can be rotated or pivoted to change at what point the reference beam passes through the reference beam lens.

9. The holographic storage device or system of claim 1, wherein the holographic storage medium comprises a recording material layer and an absorptive layer behind the recording material layer for absorbing light during the recording of one or more data pages in the holographic storage medium.

10. The holographic storage device or system of claim 1, which further comprises a polytopic filter.

11. The holographic storage device or system of claim 1, which further comprises a servo system for reading marks on the holographic storage medium to identify a location on the holographic storage medium.

12. The holographic storage device or system of claim 1, which further comprises a curing system for post-curing the holographic storage medium after one or more data pages are recorded in the holographic storage medium.

13. The holographic storage device or system of claim 1, wherein the objective lens mover mechanically moves the objective lens parallel to an upper surface of the holographic storage medium.

14. The holographic storage device or system of claim 1, wherein the objective lens has an optical axis and where the objective lens mover can mechanically move the objective lens parallel to the optical axis to focus the objective lens.

15. The holographic storage device or system of claim 1, wherein the reference beam has a changeable wavelength, and wherein the wavelength can be changed to compensate for temperature changes.

16. The device of claim 1, wherein the reference beam is diverged by the objective lens prior to the reference beam entering the holographic storage medium.

17. The device of claim 1, wherein the change in the angle of the reference beam relative to the holographic storage medium compensates for the tilt of the holographic storage medium.

18. The device of claim 1, wherein multiplexing of the one or more data pages in the holographic storage medium occurs by moving the same objective lens in the direction parallel to the upper surface of the holographic storage medium.

19. The device of claim 1, wherein an angle of incidence of the data beam on the holographic storage medium is changed by moving the same objective lens in the direction parallel to the upper surface of the holographic storage medium.

20. A method comprising the following steps:
(a) recording one or more data pages in a holographic storage medium using a data beam and a reference beam that have both passed through a same objective lens; and
(b) moving the same objective lens in a direction parallel to the upper surface of the holographic storage medium to thereby change an angle of the reference beam relative to the holographic storage medium,
wherein the data beam is angled at a first angle with respect to the optical axis of the objective lens when the data beam passes through the objective lens,
wherein the reference beam has an optical axis that is angled at a second angle with respect to the optical axis of the objective lens when the reference beam passes through the objective lens,
wherein the first and second angles are different when at least some of the one or more data pages are recorded in the holographic storage medium, and
wherein an angle of incidence of the reference beam on the holographic storage medium is changed during step (b) by moving the same objective lens in the direction parallel to the upper surface of the holographic storage medium.

21. The method of claim 20, wherein step (a) comprises polytopic multiplexing of a plurality of data pages.

22. The method of claim 20, further comprising the following step:
(c) reading selected data pages of the one or more data pages using phase conjugate readout.

23. The method of claim 20, wherein step (b) comprises moving the objective lens orthogonally to an optical axis of the reference beam.

24. The method of claim 20, wherein step (b) comprises moving the objective lens parallel to the optical axis of the reference beam to thereby generate a diverging or converging reference beam.

25. The method of claim 20, wherein step (b) comprises compensating for the tilt of the holographic storage medium.

26. The method of claim 20, further comprising the following step:
(d) adjusting a dither of the objective lens to compensate for temperature changes in the holographic storage medium.

27. The method of claim 20, further comprising the following step:
(e) adjusting a wavelength of the reference beam or data beam to compensate for temperature changes in the holographic storage medium.

28. The method of claim 20, wherein the reference beam is converged by the objective lens prior to the reference beam entering the holographic storage medium.

29. The method of claim 20, wherein multiplexing of the one or more data pages in the holographic storage medium occurs by moving the same objective lens in the direction parallel to the upper surface of the holographic storage medium.

30. The method of claim 20, wherein an angle of incidence of the data beam on the holographic storage medium is changed during step (b) by moving the same objective lens in the direction parallel to the upper surface of the holographic storage medium.

* * * * *

UNITED STATES PATENT AND TRADEMARK OFFICE
CERTIFICATE OF CORRECTION

PATENT NO. : 7,742,209 B2
APPLICATION NO. : 11/840410
DATED : June 22, 2010
INVENTOR(S) : Kevin R. Curtis et al.

It is certified that error appears in the above-identified patent and that said Letters Patent is hereby corrected as shown below:

ON THE TITLE PAGE:

Item (73) Assignee: should read: InPhase Technologies, Longmont, CO (US)
Hitachi, Ltd., Tokyo (JP)

Signed and Sealed this
Seventeenth Day of April, 2012

David J. Kappos
*Director of the United States Patent and Trademark Office*